United States Patent [19]

Long et al.

[11] 3,993,601

[45] Nov. 23, 1976

[54] PROCESS FOR PREPARING A HEAVY CRUDE CONVERSION CATALYST

[75] Inventors: Fred M. Long; Willard H. Sawyer, both of Baton Rouge, La.

[73] Assignee: Exxon Research and Engineering Company, Linden, N.J.

[22] Filed: Dec. 16, 1974

[21] Appl. No.: 533,313

Related U.S. Application Data

[63] Continuation-in-part of Ser. No. 440,302, Feb. 7, 1974, abandoned.

[52] U.S. Cl. .............................. 252/462; 252/463; 252/465; 252/466 J; 252/466 T
[51] Int. Cl.$^2$ .............. B01J 21/04; B01J 23/10; B01J 23/84
[58] Field of Search ........ 252/462, 463, 465, 466 J, 252/466 PT; 423/630

[56] References Cited
UNITED STATES PATENTS

| | | | |
|---|---|---|---|
| 3,151,939 | 10/1964 | Kehl et al. ...................... | 252/463 X |
| 3,352,636 | 11/1967 | Wilson et al. .................... | 252/463 X |
| 3,520,654 | 7/1970 | Carr et al. ........................ | 252/463 X |
| 3,673,079 | 6/1972 | Mulaskey et al. ................ | 252/465 |
| 3,779,947 | 12/1973 | Mitsche et al. ................ | 252/466 PT |

Primary Examiner—W. J. Shine
Attorney, Agent, or Firm—L. A. Proctor

[57] ABSTRACT

This invention relates to novel catalysts, of two distinct types, useful for the catalytic hydroconversion of the 1050° F.+ hydrocarbon material contained in heavy crudes and residua such that the resulting product will be suitable for further processing in conventional refinery operations allowing maximization of clean liquid products. Catalysts, which include Group VIB and Group VIII metals, preferably in admixture, and preferably including a Group IVA metal, notably germanium, having certain critical ranges of physical characteristics inclusive of large uniform pore sizes, are used for the conversion, these having been shown to possess improved catalytic activity and selectivity for the hydroconversion of the 1050° F.+ materials of the heavy feeds and residua. Novel methods are described for the preparation of such catalysts, as well as for use of such catalyst. One of the catalysts, i.e., one having properties inclusive of a large number of pores in the 100–275A pore size diameter range, is particularly suitable as a first stage catalyst and the other, which has properties inclusive of a large number of pores in the 100–200A pore size diameter, is especially suitable as a second stage catalyst for use in processing the effluent of said first stage.

19 Claims, No Drawings

PROCESS FOR PREPARING A HEAVY CRUDE CONVERSION CATALYST

This is a continuation-in-part of abandoned application Ser. No. 440,302 filed Feb. 7, 1974 by Fred M. Long et al, herewith incorporated by reference.

Other related applications which describe new and improved catalysts, and hydroconversion processes, or processes for cracking the 1050° F.+ hydrocarbon portion of heavy whole crudes and residua to yield therefrom lighter boiling usable products, particularly from unconventional heavy crudes and residua which contain appreciable amounts of sulfur and nitrogen, high quantities of the so-called heavy metals, e.g., nickel and vanadium, as well as high "Con. carbon," high carbon-to-hydrogen ratios, high asphaltenes, ash, sand, scale, and the like, are application Ser. No. 533,314, filed Dec. 16, 1974, which is a continuation-in-part of abandoned application Ser. No. 440,303, filed Feb. 7, 1974, by G. P. Hamner; application Ser. No. 533,299, filed Dec. 16, 1974, which is a continuation-in-part of abandoned application Ser. No. 440,285 by W. F. Arey, Jr. et al; application Ser. No. 533,300, filed Dec. 16, 1974, which is a continuation-in-part of abandoned application Ser. No. 440,290 by W. F. Arey, Jr. et al; application Ser. No. 533,301, filed Dec. 16, 1974, which is a continuation-in-part of abandoned application Ser. No. 440,315 by G. P. Hamner; application Ser. No. 533,311, filed Dec. 16, 1974, which is a continuation-in-part of abandoned application Ser. No. 440,302 by W. F. Arey, Jr. et al; application Ser. No. 533,312, filed Dec. 16, 1974, which is a continuation-in-part of abandoned application Ser. No. 440,316 by W. J. Mattox; and application Ser. No. 533,331, filed Dec. 16, 1974, which is a continuation-in-part of abandoned application Ser. No. 440,301 by W. F. Arey, Jr. et al.

The hydrotreating of hydrocarbon or hydrocarbonaceous feedstocks, including particularly heavy petroleum crudes and residua, is not new, and such processes are widely disclosed in the patent literature. The molecular make-up of such feedstocks is often such that they contain considerable amounts of heavy oils, resins, nondistillable asphaltenes, i.e., pentane ($C_5$) or heptane insoluble, or high molecular weight coke precursors, and the like, which contain high nitrogen, sulfur, oxygen and metallo-organic complexes, or metal contaminants which, when subjected to heat, coagulate, polymerize or decompose and create materials difficult to further process. In the past, the lower molecular weight or gas oil portion of such feedstocks has been catalytically converted and upgraded to high value fuels, while the heavy ends or 1050° F.+ materials were split out, then generally used as low grade fuel or as asphaltic materials. The 1050° F.+ material, often termed "the bottom of the barrel," is of low commercial value, even less than an equivalent quantity of raw crude. Recent economics, however, have made it necessary to hydrotreat even the 1050° F.+ residues to desulfurize these materials, due to the environmental hazards created by burning the sulfur-containing fuels. Whereas the literature describes a number of catalytic hydrodesulfurization processes for the treatment of such feedstocks, hydrocarbon conversion is minimized essentially to that required for the breaking of carbon-sulfur bonds of the relatively low molecular weight hydrocarbons, with subsequent hydrogenation of the sulfur moieties to eliminate the sulfur which is evolved as hydrogen sulfide gas.

Processes for the conversion of feeds containing 1050° F.+ hydrocarbon materials to lower molecular weight hydrocarbons at high temperatures and pressures are likewise not unknown. Present processes for such conversion generally involve coking, which is industry's primary upgrading process. In one such process, the excessive carbon in the feed is coked and then removed as high sulfurmetals coke, and the coke then gasified to make a fuel gas. Thermally cracked liquids are concurrently produced. In another such process, the entire feed is gasified to make a substitute natural gas. The coking processes, however, have certain limitations, the most important being that large quantities of sour coke and gas are produced at the expense of liquids, and it is difficult to dispose of sour coke. Processes are also known for the catalytic hydroconversion of crudes or feeds which contain 1050° F.+ hydrocarbon materials. For example, in Johanson's U.S. Pat. No. 2,987,465, a hydrocarbon feed and gas are passed upwardly through an ebullating bed of particulate catalytic solids. The process is thus conducted under conditions which establish a random motion of the catalytic particles in the liquid without carrying the solids out of the reactor. Based on the solid size and density of the catalyst particles, and liquid density, velocity and viscosity, the mass of particulate solids is expanded from about 10 percent greater volume than the settled state of the mass to perhaps two or three times the settled volume. While such process has been found useful in the treatment of such feeds, it too has its limitations. Thus, there are certain disadvantages associated with the activity of the catalysts used in such process. For example, in processing residua, inter alia, a tarry, sticky material is formed upon and apparently absorbed by the catalyst particles, this all too rapidly fouling the catalyst. Conglomeration of the catalyst particles produces channeling and lowering of catalyst performance.

It is thus particularly difficult to treat crudes or residuas which contain large amounts of 1050° F.+ hydrocarbons, even where there is no significant conversion of hydrocarbon to lower boiling products. Even hydrodesulfurization processes, which have been recognized as potentially useful for effecting the removal of sulfur from such fuels, have been relatively ineffective for the hydrotreatment of residua. High operation costs associated with the relatively high pressures required, high hydrogen consumption and short catalyst life, inter alia, have hindered commercial utilization of such processes. The hydroconversion of 1050° F.+ hydrocarbon materials to lower boiling, more useful hydrocarbons presents an acutely more difficult problem.

Supply and demand considerations, nonetheless, make it imperative that new and improved methods be developed for conversion of the heavy whole crudes and residua, particularly for the conversion of the 1050° F.+ portion of these materials. In fact, it is imperative that processes be developed which make it practical for the hydroconversion of new types of heavy crudes and residua which contain great amounts of the 1050° F.+ materials, which crudes and residua cannot be handled by present hydroconversion processes. It is thus known that within a few years perhaps one-half of the consumption of energy in this country may be derived from particularly unconventional materials such as Athabasca tar sands, Canadian and Venezuelan heavy oils and Venezuelan heavy tars. These so-called heavy crudes are different from conventional crudes in at least four important aspects, each of which makes hydroconversion of such crudes by present methods entirely unfeasible — viz., they have (1) very high Conradson carbon (i.e., "Con. carbon") or carbon to hydrogen ratios (i.e., relatively high carbon and low hydrogen content), (2) very high metals content, particularly as regards the amount of nickel and vanadium, (3) they are ultra-high in their content of materials boiling above 1050° F., e.g., asphaltenes, and even (4) contain considerable amounts of sand and scale. Properties which readily distinguish these new materials from conventional crudes are thus: high metals, high asphaltenes, high carbon: hydrogen ratios, and a high volume percent of hydrocarbons boiling above 1050° F. The presence of the greater amounts of metals and the higher carbon content of the heavy crudes, in particular, makes any considerations regarding the processing of these materials most difficult and expensive. The high Con. carbon and carbon: hydrogen ratios are considerably higher than those of any presently usable hydrocarbon liquids.

There is thus a desideratum in the art, dictated in part by an impending energy crunch, which makes imperative the development of new and effective hydroconversion processes, or processes for cracking the 1050° F.+ hydrocarbon portion of heavy whole crudes and residua to yield therefrom lighter boiling usable products. There is particular need for catalytic processes, inclusive of new catalysts and techniques for their preparation, which can effectively hydroprocess and convert the 1050° F.+ hydrocarbon portion of these unconventional heavy crudes and residua which contain appreciable amounts of sulfur and nitrogen, high quantities of the so-called heavy metals, e.g., nickel and vanadium, as well as high Con. carbons, high carbon to hydrogen ratios, high asphaltenes, sand, scale and the like, supra.

A primary objective of the present invention, therefore, is to obviate the several prior art deficiencies, and to supply these several needs.

A particular object is to provide new and improved catalysts, particularly useful in hydrocarbon conversion reactions, particularly reactions involving the hydroconversion of the 1050° F.+ hydrocarbon portion of heavy crudes and residua.

A further object is to supply new and improved methods for the preparation of such catalysts.

Another object is to provide a new and improved hydrocarbon conversion process, or hydroconversion process useful in converting the 1050° F.+ hydrocarbon portion of feeds comprising heavy crudes and residua to useful lower boiling products while simultaneously producing appreciable Con. carbon reduction, hydrodesulfurization, hydrodenitrogenation and demetallization of the feeds.

These objects and others are achieved in accordance with the present invention which embodies a. novel catalysts which, although they possess certain common characteristics, are of two distinct types as relates to an essential combination of properties regarding pore size (or pore size distribution), surface area and pore volume, this enabling each to perform its function in a unique manner, a first catalyst providing enhanced selectivity for conversion and demetallization of whole heavy crudes and residua, in the presence of added hydrogen, which contains relatively large quantities of 1050° F.+ materials, i.e., asphaltenes ($C_5$ insoluble) and other large hydrocarbon molecules, which are effectively converted to lower molecular weight products, and a second catalyst particularly suitable for the efficient conversion, demetallization and Con. carbon reduction of hydrocarbon materials, particularly of a feed of character similar to the product resultant from a hydroconversion process utilizing said first catalyst. Conversion, as used herein, thus requires chemical alteration of the 1050° F.+ hydrocarbon molecules to form lower molecular weight molecules boiling below 1050° F. (i.e., 1050° F.−) and it is measured by the weight decrease in the amount of 1050° F.+ hydrocarbons contained in the original feed times 100, divided by the amount of 1050° F.+ material originally present in the feed. These catalysts in common comprise catalytically active amounts of a hydrogenation component which includes a Group VIB or Group VIII metal (especially, a Group VIII nonnoble metal), or both (Periodic Table of the Elements, E. H. Sargent and Co., Copyright 1962 Dyna-Slide Co.), particularly molybdenum or tungsten of Group VIB, and cobalt or nickel of Group VIII, and preferably a Group VIB and Group VIII metal in admixture one metal with the other, or with other metals, or both, particularly Group IVA metals, composited with a refractory inorganic support, notably a porous, inorganic oxide support, particularly alumina, or more particularly gamma alumina, i. said first catalyst, hereinafter termed "R-1" catalyst for convenience, including a combination of properties comprising, when the catalyst is of size ranging up to 1/50 inch average particle size diameter, at least about 20 percent, preferably at least about 25 percent, and more preferably at least about 70 percent of its total pore volume of absolute diameter within the range of about 100A (Angstrom units) to about 200A; when the catalyst is of size ranging from about 1/50 inch up to 1/25 inch average particle size diameter, at least about 15 percent, preferably at least about 20 percent, and more preferably at least about 45 percent of its total pore volume of absolute diameter within the range of about 150A to about 250A; when the catalyst is of size ranging from about 1/25 inch to about ⅛ inch average particle size diameter, at least about 15 percent, preferably at least about 20 percent, and more preferably at least about 30 percent of its total pore volume of absolute diameter within the range of about 175A to about 275A; wherein, in each of these catalysts of differing ranges of particle size distributions, the pore volumes resultant from pores of 50A, and smaller, i.e., 50A−, are minimized; and preferably, while in catalyst average particle size below 1/50 inch, the pore volume resultant from pores of diameter above 300A, i.e., 300A+, is minimized, and in catalysts of average particle size above 1/50 inch, the pore volume resultant from pores above 350A, i.e., 350A+, is minimized; the surface areas and pore volumes of the catalysts being interrelated with particle size, and pore size distributions, surface areas ranging at least about 200 m²/g to about 600 m²/g, and preferably at least about 250 m²/g to about 450 m²/g, with pore volumes ranging from about 0.8 to about 3.0 cc/g, and preferably from about 1.1 to about 2.3 cc/g (B.E.T.):

ii. said second catalyst, hereinafter termed "R-2" catalyst for convenience, over the spectrum of particle sizes ranging to ⅛ inch average particle size diameter, is one including a combination of properties comprising at least about 55 percent, and preferably at least about 70 percent of its total pore volume of absolute diameter within the range of about 100A to about 200A; less than 10 percent, preferably less than 1 percent of the pore volume results from pores of diameters 50A—; less than about 25 percent, and preferably less than 1 percent of the total pore volume results from pores of diameters ranging 300A+; surface areas ranging from about 200 m²/g to about 600 m²/g, preferably from about 250 m²/g to about 350 m²/g, and pore volumes ranging from about 0.6 to about 1.5 cc/g, and preferably from about 0.9 to about 1.3 cc/g (B.E.T.):

b. a novel method for the preparation of said R-1 and R-2 catalysts from an aqueous or alcohol synthesis sol comprising dispersing an aluminum halide in an aqueous or alcohol medium, and adding an organic reagent which combines with the halide and removes the halide from solution as an organic halide, with control of water (or alcohol):alumina salt ratios, and control and removal of hydrogen halide acid generated with reaction, preferably with the additional incorporation of Group VIII noble metals or lanthanum or lanthanum series metal salts, or both, to provide the selective pore size distributions, particularly as relates to the formation of extrudates, with concurrent optimization of surface area and pore volume, as required for the production of R-1 and R-2 catalysts; and c. a conversion process, conducted with said R-1 catalyst, in an initial or first reaction zone comprising one or more stages (and in one or more reactors) wherein a hydrocarbon or hydrocarbonaceous feed, e.g., a coal liquid, whole heavy crude or residua feed, containing 1050° F.+ materials, especially one having the following characteristics,

|  | Operable Range | Preferred Range |
|---|---|---|
| Gravity, ° API | −5 to 20 | 0–14 |
| Heavy Metals (Ni & V), ppm | 5–1000 | 200–600 |
| 1050° F.+, Wt.% | 10–100 | 40–100 |
| Asphaltenes (C₅ insolubles), Wt.% | 5–50 | 15–30 |
| Con. Carbon, wt.% | 5–50 | 10–30 | is contacted, in the presence of hydrogen at severities sufficient to convert at least about 30 percent by weight and preferably from about 40 percent to about 60 percent of the 1050° F.+ materials of the crude or residua present to 1050° F.— materials, remove at least about 75 percent, and preferably from about 80 to about 95 percent, by weight of the metals, preferably producing a product having the following characteristics:

|  | Operable Range | Preferred Range |
|---|---|---|
| Gravity, ° API | 14–30 | 15–25 |
| Heavy Metals (Ni % V), ppm | 10–100 | 40–80 |
| 1050° F.+, Wt.% | 10–50 | 25–40 |
| Asphaltenes (C₅ insolubles), Wt.% | 3–20 | 5–15 |
| Con. Carbon, Wt.% | 3–20 | 5–10 | which product is suitable for further contact, in the presence of hydrogen, in a second or subsequent reaction zone comprising one or more stages (and in one or more reactors) with said R-2 catalyst at severities sufficient to convert at least about 50 percent, and preferably from about 60 percent to about 75 percent of the 1050° F.+ materials of the crude or residua to 1050° F.— materials, remove at least about 90 percent, preferably from about 97 percent to about 100 percent, by weight of the metals, and reduce Con. carbon from about 50 percent to about 100 percent, and preferably from about 75 percent to about 90 percent, especially to produce a product having the following characteristics:

|  | Operable Range | Preferred Range |
|---|---|---|
| Gravity, ° API | 18–30 | 20–28 |
| Heavy Metals (Ni & V), ppm | <50 | <5 |
| 1050° F.+, Wt.% | 5–30 | 10–25 |
| Asphaltenes (C₅ insolubles), Wt.% | <3 | <1 |
| Con. Carbon, Wt.% | <5 | <3 |

In their optimum forms, the absolute pore size diameter, of the R-1 catalyst, dependent on particle size, is maximized within the 100–200A, 150–250A, and 175–275A ranges, and the R-2 catalyst within the 100–200A range, respectively. It is not practical, of course, to eliminate the presence of all pores of sizes which do not fall within these ranges, but methods of preparation are known, particularly methods of preparation according to this invention, which does indeed make it practical to produce catalyst particles of absolute pore size diameters highly concentrated within these desired ranges. The following tabulations show the pore size distributions, as percent of total pore volume, of marginal and preferred catalysts of this invention:

| R-1 CATALYST Distribution of Pore Diameters[1] | Marginal | Preferred | More Preferred |
|---|---|---|---|
| 1/500 up to 1/50″[2] | | | |
| 0–50A | <20% | <10% | <2% |
| 100–200A | >20% | >25% | >70% |
| 300A+ | <30% | <25% | <1% |
| Pore Volume, cc/g | 0.8–1.4 | 0.9–1.5 | 1.1–1.7 |
| Surface Area, m²/g | 300–450 | 310–500 | 325–550 |
| 1/50 up to 1/25″[2] | | | |
| 0–50A | <10% | <5% | <1% |
| 150–250A | >15% | >20% | >45% |
| 350A+ | <35% | <30% | <7% |
| Pore Volume, cc/g | 1.1–1.7 | 1.3–1.9 | 1.5–2.1 |
| Surface Area, m²/g | 320–475 | 340–575 | 360–600 |
| 1/25 up to 1/8″[2] | | | |
| 0–50A | <5% | <4% | <3% |
| 175–275A | >15% | >20% | >30% |
| 350A+ | <40% | <35% | <25% |
| Pore Volume, cc/g | 1.3–1.9 | 1.5–2.1 | 1.8–2.3 |
| Surface Area, m²/g | 340–500 | 350–600 | 370–650 |

| R-2 CATALYST Distribution of Pore Diameters[1] | Preferred | More Preferred |
|---|---|---|
| 1/500 up to 1/8″[2] | | |
| 0–50A | <10% | <1% |
| 100–200A | >55% | >70% |
| 300A+ | <25% | <1% |

[1] Measured by nitrogen adsorption isotherm, wherein nitrogen adsorbed is at various pressures. Technique described in Ballou, et al, Analytical Chemistry, Vol. 32, April, 1960, using Aminco Adsorptomat [(Catalogue No. 4-4680) and Multiple Sample Accessory (Catalogue No. 4-4685) Instruction No. 861-A] which uses the principle of adsorption and desorption of gas by a catalyst specimen at the boiling point of nitrogen.
[2] Average particle diameter in inches.

The R-1 and R-2 catalysts can be the same or different as regards their specific chemical composition, qualitatively or quantitatively, though certain different forms of these catalysts have been found to provide better results when used in the different and preferred process modes—viz. when R-1 is used in an initial or first reaction zone to process heavy crudes or residua, hereinafter referred to as "R-1 service," and when R-2 is used in a second or subsequent reaction zone to process, e.g. the product of said initial or first reaction zone (or feed of similar nature), hereinafter referred to as "R-2 service." In general, however, both the R-1 and R-2 catalysts can comprise a composite of a refractory inorganic support material, preferably a porous inorganic oxide support with a metal or compound of a metal, or metals, selected from Group VIB or Group VIII, or both, the metals generally existing as oxides, sulfides, reduced forms of the metal or as mixtures of these and other forms. Suitably, the composition of the catalysts comprises from about 5 to about 50 percent, preferably from about 15 to about 25 percent (as the oxide) of the Group VIB metal, and from about 1 to about 12 percent, preferably from about 4 to about 8 percent (as the oxide) of the Group VIII metal, based on the total weight (dry basis) of the composition. The preferred active metallic components, and forms thereof, comprise an oxide or sulfide of molybdenum and tungsten of Group VIB, an oxide or sulfide of nickel or cobalt of Group VIII, preferably a mixture of one of said Group VIB and one of said Group VIII metals, admixed one with the other and inclusive of third metal components of Groups VIB, VIII and other metals, particularly Group IVA metals. The preferred R-1 and R-2 catalysts are constituted of an admixture of cobalt and molybdenum, but in some cases the preferred R-2 catalysts may be comprised of nickel and molybdenum. The nickel-molybdenum catalyst in R-2 service possesses very high hydrogenation activity and is particularly effective in reducing Con. carbon. Other suitable Group VIB and VIII metals include, for example, chromium, platinum, palladium, iridium, osmium, ruthenium, rhodium, and the like. The inorganic oxide supports suitably comprise alumina, silica, zirconia, magnesia, boria, phosphate, titania, ceria, thoria, and the like. The preferred support is alumina, preferably gamma alumina, which in R-2 service is preferably stabilized with silica in concentration ranging from about 0.1 to about 20 percent, preferably from about 10 to about 20 percent, based on the total weight (dry basis) alumina-silica composition (inclusive of metal components). The catalyst composition can be in the form of beads, aggregates of various particle sizes, extrudates, tablets or pellets, depending upon the type of process and conditions to which the catalyst is to be exposed.

Particularly preferred catalysts are composites of nickel or cobalt oxide with molybdenum, used in the following approximate proportions: from about 1 to about 12 weight percent, preferably from about 4 to about 8 weight percent of nickel or cobalt oxides; and from about 5 to about 50 weight percent, preferably from about 15 to about 25 weight percent of molybdenum oxide on a suitable support, such as alumina. A particularly preferred support for R-2 catalyst comprises alumina containing from about 10 to about 20 percent silica. The catalyst is sulfided to form the most active species.

The Group VIB and Group VIII metal components, admixed one component with the other or with a third or greater number of metal components, can be composited or intimately associated with the porous inorganic oxide support or carrier by various techniques known to the art, such as by impregnation of a support with the metals, ion exchange, coprecipitation of the metals with the alumina in the sol or gel form, and the like. For example, a preformed alumina support can be impregnated by an "incipient wetness" technique, or technique wherein a metal, or metals, is contained in a solution in measured amount and the entire solution is absorbed into the support which is then dried, calcined, etc., to form the catalyst. Also, for example, the catalyst composite can be formed from a cogel by adding together suitable reagents such as salts of the Group VIB or Group VIII metals, or both, and ammonium hydroxide or ammonium carbonate, and a salt aluminum such as aluminum chloride or aluminum sulfate to form aluminum hydroxide. The aluminum hydroxide containing the salts of the Groups VIB or Group VIII metals, or both, and additional metals if desired can then be heated, dried, formed into pellets, or extruded, and then calcined. Catalysts formed from cogels do not possess pore size distributions as uniform as those formed by impregnation methods.

The catalysts can be used in the reaction zones as fixed beds, ebullating beds or in slurry form within beds. When used in the form of fixed beds, the particle size diameter of the catalysts generally ranges from about 1/32 to about ⅛ inch, preferably about 1/16 inch. When used as ebullating beds the catalyst generally range about 1/32 inch diameter and smaller, and when used as slurry beds the particle sizes generally range from about 100 to about 400 microns. The bulk density of the R-1 catalyst generally ranges from about 0.2 to about 0.6 g/cc, preferably from about 0.2 to about 0.5 g/cc, depending on particle size, and that of the R-2 catalyst ranges from about 0.3 to about 0.8 g/cc, preferably from about 0.35 to about 0.55 g/cc.

The catalysts of this invention further comprise a metal, or metals, of Group IVA, or compounds thereof. The catalysts will thus comprise germanium, tin, or lead, or admixture of such metals with each other or with other metals, or both, in combination with the Group VIB or Group VIII metals, or admixture thereof. The Group IVA metals act as promoters for R-1 and R-2 catalysts in enhancing the rate of demetallization of a feed. Of the Group IVA metals, germanium is particularly preferred. Suitably, the Group IVA metal comprises from about 0.01 to about 10 percent, preferably from about 2.0 to about 5 percent of the catalyst, based on the total weight (dry basis) of the composition. The Group IVA metals must be incorporated within the catalyst by impregnation.

A feature of both the R-1 and R-2 catalysts is that each is of very high surface area and contains ultra-high pore volume, this providing an extremely great number of active metal sites. This, in combination with the selected pore size distributions of the R-1 and R-2 catalysts, provides catalysts admirably suitable for the demetallization and hydroconversion of feeds of the characteristics described, which feeds usually contain additional high concentrations of sulfur and nitrogen. In R-1 service, in utilizing R-1 catalyst in its most preferred form, the number of pores ranging between about 100–275A absolute pore size diameter is maximized, dependent on particle size, as is surface area and pore volume consistent with practical catalyst preparation procedures and with regard to the particle crush strength requirements of the process. Moreover, the number of pores which are smaller than 50A, and preferably those greater than about 300A, or about 350A when the average particle size diameter exceeds about 1/50 inch, are minimized. R-1 catalyst of such character has thus proven outstanding, even under the stringent requirements of R-1 service, in retaining considerable quantities of heavy metals while yet remaining active over extraordinarily long periods. For Example, the R-1 catalyst, when operated at a 700° F. start-of-run temperature (SOR), has been shown suitable for maintaining 1050° F.+ conversion levels ranging from about 20 to about 40 percent, and higher, for periods ranging up to about 70 days, and longer. In fact, this catalyst, at the end of such period, has been found to retain over 150 percent of its own weight of heavy metals from whole heavy crudes and residua feeds. Moreover, while accomplishing this, the R-1 catalyst also effectively removes much of the sulfur and nitrogen in hydrodesulfurization and hydrodenitrogenation reactions. For example, whole heavy crudes and residua of the type characterized often contain from about 2 to about 7 weight percent, usually from about 3 to about 6 percent sulfur, and often from about 0.2 to about 0.8 percent, usually from about 0.3 to about 0.7 percent nitrogen. Generally, from about 75 to about 95 percent of the sulfur, and from about 25 to about 60 percent of the nitrogen can be effectively removed from such heavy crudes and residua in R-1 service while obtaining high conversion. The product of such reaction, unlike the original feed processed over the R-1 catalyst, is now suitable as feed to a coker to provide greater yields of $C_3^+$ liquid product than would otherwise have been possible by coking the original feed, and the coke product is less sour and less contaminated by heavy metals. For example, it has been found that by operating the R-1 catalyst at a start-of-run (SOR) temperature of about 700° F. at a low space velocity of about 0.25–0.50 V/H/V, a product is obtained which is highly suitable for coking. Compared to coking of the raw whole crude or residuum, the $C_3^+$ liquid product yield is increased from 86 to 97 vol.% and the coke yield is decreased from 70%. The product coke contains only 2.5 wt.% sulfur compared to 5.9% sulfur coke from coking of the raw feed.

The product of the reaction conducted at a space velocity of 0.25 V/Hr./V is also highly suited for processing in a resid catalytic cracking operation. The raw feed contains too much heavy metals and Con carbon for conventional catalytic cracking. The product, on the other hand, is low enough in heavy metals and Con carbon to be converted in a resid catalytic cracking operation. Hence, the hydroconverted product is fed directly to a fluid catalytic cracker operating on a cheap amorphous catalyst at low oncethrough 430° F.− conversion (ca. 25%) but at high 950° F.+ conversion (ca. 95%). The result is that a 97% yield ($C_3^+$) of a synthetic crude suitable for further processing in conventional refinery equipment is obtained. Coke yield, produced on the cracking catalyst, is 7.5 wt.%.

By operating the reactor, or reactors, containing the R-1 catalyst at a start-of-run temperature of about 750° F. and at a space velocity of about 0.5 V/Hr./V, a product is made that is suitable for use in a catalytic cracker employing zeolite cracking catalyst. By operating at about an 80% 430° F.− conversion, a $C_3^+$ $_{yield\ of}$ 107 volume percent and a coke-on-catalyst yield of 7.5 wt.% can be obtained. However, the preferred mode of operation is to remove 90% of the metals from the raw feed with the R-1 catalyst at a SOR temperature of about 750° F. and a high space velocity of about 1.0 V/Hr./V. This product is now suitable for R-2 service to provide feeds which can be used directly in conventional commercial petroleum operations, especially in conventional hydrocracking and catalytic cracking operations for the production of gasoline and other light distillates. The product from R-2 should contain about 2 ppm heavy metals, or less, with a Con carbon of about 3.3 wt.%. This material, when converted in a catalytic cracker employing zeolite catalyst at a catalyst makeup rate of 0.4 lb./Bbl. at about 80% 430° F.− conversion, will produce a yield of 110 vol.% $C_3^+$ $_{and}$ 6.7 wt.% coke on catalyst.

In the preferred mode of operation (i.e., 750° F. SOR and 1 V/Hr./V), this catalyst will have removed up to 90% and more of the metals in the raw feed after an operation of 27 or more days, the catalyst retaining over about 95% of its weight of metals from whole heavy crudes and residuum feeds. The amount of sulfur and nitrogen that is removed is comparable to that presented in the preceding paragraph.

In utilizing R-2 catalyst, in its most preferred form, the number of pores ranging between about 100–200A absolute pore size diameter is maximized, as is the surface area and pore volume consistent with practical catalyst preparation procedures and with regard to the crush strength requirements of the process. This means, of course, that the number of pores of diameter which are smaller than 100A (especially 50A−) or greater than about 200A are minimized, especially the 300A+ pores. R-2 catalyst of such character has thus proven outstanding in R-2 service which, while not as stringent as R-1 service, is nonetheless rather severe, the R-2 catalyst retaining considerable quantities of heavy metals while yet remaining active for Con. carbon conversion over long periods. Moreover, the R-2 catalyst accomplishes this while achieving high hydrodesulfurization and hydrodenitrogenation of the feed. For example, operating at 650° F. SOR temperature and at a space velocity of 0.5 V/Hr./V, the R-2 catalyst reduces the metals content of the R-1 product from a level of about 60 ppm to about 5 ppm, representing about 99% metals removal based on total feed. At the same time, asphaltenes are reduced to near 1 wt.% which is necessary for obtaining Con. carbon levels of 2-3 wt.%, based on product. Sulfur level reaches about 0.3 wt.%, representing over 90% removal of sulfur based on the raw feed, The catalyst is also effective for effecting 1050° F.+ conversions, and conversion levels (based on raw feed) of 60% and higher have been obtained. The product of R-2 service is suitable as feeds for conventional petroleum processing operations, particularly hydrocracking and catalytic cracking operations.

The reasons for the effectiveness of the R-1 catalysts in the hydroconversion of the 1050° F.+ hydrocarbon portions of heavy crudes and residua, and the effectiveness of the R-2 catalyst in the hydroconversion of the 1050° F.+ hydrocarbon portion of the products of R-1 service are not understood. However, whereas there is no desire to be bound by any specific theory of mechanism, a theory has been postulated which aids in explaining some of the results which have been observed. It is thus believed that the pore sizes for R-1 and R-2 catalysts are selectively adsorptive as regards asphaltenes which range in size from relatively small to very large in terms of their molecular weight and physical size. The range of pores of about 100–275A diameter in the case of the R-1 catalyst are thus believed to admit asphaltenes of small and even relatively large sizes, with hydrogen, into contact with a great number of reaction sites due to this penetration. The high number of reaction sites is thus drastically increased vis-a-vis conventional catalysts because of the unusually high surface area and pore volume which provides essentially optimum hydroconversion of these molecules as they penetrate into the interior of the catalyst particles, and are caused to react by the conditions imposed thereon. This pore size range facilitates egress of the reacted moieties, or by-products of the reaction. On the other hand, pores of smaller diameter either do not permit ingress of relatively large amounts of asphaltenes due to the very large size, or the egress of the asphaltenes which are admitted into the particles is hampered by the small size of the pores, or both. It is found that the diffusivity of asphaltenes into a catalyst particle, increases with increase in the pore diameter of the particle, and consequently the activity of the cayalyst is effectively increased due to the greater availability of reactive sites. However, as pore diameter is increased, the surface area of the catalyst particle is decreased. One thus finds that, at constant intrinsic activity, the effective activity of a catalyst increases as pore diameter is increased due to the increased diffusivity of the particle; and decreases due to the decrease in surface area. The net effect, however, is that there is an optimum range of pore size distributions for catalyst of given, or constant, average particle size. This optimum range of effective activity is found to shift with change in particle size, in particles of similar surface area, and pore volume, apparently because of the greater difficulty of asphaltene molecules to diffuse through the longer channels of larger particles vis-a-vis the lesser difficulty of asphaltene molecules to diffuse through the shorter channels of smaller particles. The R-2 catalyst may behave in analogous manner, as regards the ingress of asphaltenes in their penetration into the depths of the catalyst particle in their quest for active reaction sites. However, the effect of particle size on the effective activity is far less apparent with R-2 catalyst vis-a-vis R-1 catalyst. The pore size distribution of the R-2 catalyst, in combination with the high surface area and pore volume, however, does apparently optimize the activity and selectivity of the catalyst for R-2 service wherein the asphaltenes are of lower average molecular weight, a large number of the asphaltenes having been reduced in size by conversion in R-1 service.

A tri site mechanism is postulated in the reaction of the asphaltenes after their penetration into the catalyst particle. The asphaltenes, the molecular make-up of which can be generally characterized as layers of fused benzene rings and associated appended alkyl groups, first contact a dissociative adsorption site such that the layers are separated one from another. This is believed a type of hydrogen intercalation or cracking reaction which occurs at the site of a Group VIB or Group VIII metal or at active cracking sites, e.g., $SiO_2/Al_2O_3$ sites. The asphaltenes, thus reduced in size such that there is greater exposure of the heavy metal atoms within the molecule (Ni, V, Fe, etc.), then contacts a metal abstraction site whereon the metal is removed from the asphaltene molecules. The metal abstraction sites are believed increased by the Group IVA metal promoters, and may be located at or near the site occupied by a Group IVA metal. The Group VIB or Group VIII metal sites again act as "hydro-healing" sites, or locations wherein bonds dissociated by break-away of the metal from the molecule are satisfied by addition of hydrogen to the molecule.

In a preferred method for the preparation of these novel catalysts, catalysts which at least meet the marginal requirements of R-1 and R-2 catalysts as regards desired pore size distribution are prepared from alumina in a synthesis reaction, as gels or cogels wherein certain critical conditions must be observed as regards the concentration of reactants in the synthesis solution, the acidity of the synthesis solution, and the temperature of the synthesis reaction. Gel preparation without added metals, of course, requires subsequent incorporation, e.g., impregnation, of metals whereas in cogel preparation the metals are added at the time of gel formation. In such preparations, an aluminum halide, e.g., aluminum chloride, is first dispersed or slurried in water or alcohol in certain critical proportions, defined for convenience in terms of the molar ratio of water (or alcohol):aluminum halide dependent on whether it is desired to produce an R-1 or R-2 catalyst. The temperature of the aluminum halide-water (or alcohol) slurry, to which the desired Group VIB and Group VIII metals, and other metals, can be added as may be desired as in forming of a cogel, is then lowered. Normally, water is used as the solvent, but alcohols such as methanol can be used, though pore sizes tend towards the smaller diameters with alcohol solvents. It is also essential in the reaction to add a reagent which will remove the halide from solution while maintaining pH in the range of 5–8, this being preferably accomplished by addition of an olefin oxide, e.g., ethylene oxide, propylene oxide, and the like, which forms a halohydrin. The reaction is necessarily carried out at relatively low temperature, preferably from about 30° F. to about 100° F., and more preferably from about 32° F. to about 60° F. The olefin oxide is added in at least stoichiometric quantities in relation to the amount of halide to be removed from the solution, and preferably is added in molar excess to the solution. In the preparation of catalyst which at least meets the marginal pore size distribution required of R-1 catalyst, the molar ratio of olefin oxide:halide ranges from about 1.5:1 to about 2.0:1 and preferably from about 1.5:1 to about 1.7:1, while the molar ratio of water (or alcohol):aluminum halide is maintained within a range of from about 15:1 to about 30:1, and preferably from about 18:1 to about 27:1. In the preparation of catalyst which at least meets the marginal pore size distribution required of R-2 catalyst, the molar ratio of olefin oxide:chloride ranges from about 0.3:1 to about 1.5:1, and preferably from about 1.0:1 to about 1.2:1, while the molar ratio of water (or alcohol):aluminum halide is maintained within a range of from about 22:1 to about 30:1, and preferably from about 26:1 to about 28:1. Failure to remove most of the halide, e.g., chloride, from the reaction results in a failure to obtain the desired crystal growth, failure to obtain the required pore size distributions, or failure to produce a crystal sufficiently stable to retain such desired pore size distributions throughout subsequent steps required in completing the formation of the catalyst. It is believed that the required crystalline structure which shall ultimately be produced from the sol is of a nature of boehmite, termed for convenience "pseudoboehmite," and that excessive halide concentration and high pH adversely affect the proper formation of such aluminum oxy hydroxide crystalline structure.

After completion of the reaction, the temperature of the gel is raised to from about ambient to about 180° F. to form a sol. Preferably, the sol is formed at essentially ambient temperature, ranging generally from about 70° F. to about 80° F. and, on proper aging, pseudo-boehmite is produced. It is essential to age the gel at such temperature for at least about 6 hours, and preferably for about 24 hours to about 72 hours while the gel is in contact with its syneresis liquid. Lesser periods of aging results in reducing the uniformity of pore sizes, and significantly longer periods, particularly periods in excess of 6 days, often produces bimodal distribution of the pores. Failure to properly age the gel, while it is in contact with the syneresis liquid, also produces a crystal structure which is not sufficiently stable to retain the desired particle size distributions in the subsequent and necessary steps of washing, dryig and calcination.

It has been discovered that Group VIII noble metals and lanthanum and lanthanum series metals, or compounds thereof, are admirably suitable as promoters for providing narrow pore size distributions and, in conjunction with control of the concentration of the reactants employed in the synthesis, the temperature, and particularly the acidity of the synthesis solution, these promoters can be used to provide R-1 and R-2 catalysts of optimum pore size distributions. Catalysts which meet even the preferred specifications of R-1 and R-2 catalysts can thus be made by incorporation of small amounts of Group IIIB metals of Atomic Number 57 and greater, and Group VIII noble metals, or both, or compounds or salts thereof, within the solution during the synthesis. Exemplary of the former are such metals as lanthanum, and the rare earth metals of the lanthanum series such as cerium, praseodymium, neodymium, promethium, samarium, europium, gadolinium, terbium, dysprosium, holmium, erbium, thulium, ytterbium and lutetium. Exemplary of the Group VIII noble metals are ruthenium, rhodium, palladium, osmium, iridium, and platinum, which metals are less preferred than the lanthanum series metals because of their greater cost. Suitably, such metals, or compounds thereof, are added to the solution, for preparation of R-1 and R-2 catalysts, in molar ratios of promoter metals:aluminum halide ranging from about 0.001:1 to about 0.06:1, and preferably from about 0.01:1 to about 0.03:1. The reason for the effectiveness of these metals, particularly the lanthanum metals, generally added as soluble salts, e.g., as halides, acetates, nitrates, sulfates, etc., in producing the high uniformity of pore sizes in the desired ranges, when employed at the conditions defined, is not understood.

The syneresis liquid, after the aging step, is poured off of the gel or cogel. In the case of a gel, the gel can next be crushed to the desired particle size, air dried, then thoroughly washed. It is particularly preferred to wash the gel or cogel with alcohol, to remove contaminants, after which the catalyst is air dried at room temperature, and then dried at mild temperatures, e.g., at about 175°–225° F. for about 3 to 6 hours, then calcined, e.g., by heating at about 800°–1100° F. for about 1 to 4 hours, and, the gel, then impregnated with a predetermined amount of the desired metal, or metals. The washing step is critical in the formation of the desired pore size distribution. Generally, isopropanol or one of the intermediate alcohols, e.g., n-propyl isobutyl and the like promotes the formation of the desired pore sizes. Methanol, on the other hand, forms smaller pores generally, e.g., 0–100A, and hexyl alcohol forms larger pores, e.g., 300+A. Mixtures of water and intermediate alcohols also favor the formation of 0–100A pores.

Impregnation of the alumina can be done prior or subsequent to the calcination step. If subsequent to the calcination step, it is best to allow the calcined alumina to equilibrate with the moisture in the air for 4–6 hours prior to impregnation to avoid damage to the pore structure. It is imperative that the impregnation be done with a non-aqueous solution, e.g., alcohol, rather than water solution. If water solutions are used, the pore structure will readily shrink to the 0–100A pore diameter range during subsequent drying and calcination. The catalytic metals, e.g., Co and Mo, are dissolved in alcohol, e.g., methanol, and preferably isopropanol, and the solution imbibed into the alumina. Drying for 16–24 hours in air at ambient conditions, then drying for about 3–6 hours at 175°–225° F., and then calcining at 800°–1100° F. for 1–4 hours, will preserve the desired pore structure. The catalyst is then crushed and screened to the desired particle size for testing, usually 14–35 mesh (Tyler).

Extrudates of outstanding strength and quality, which meet the requirements of both R-1 and R-2 catalysts, can be prepared in accordance with a preferred and novel method of this invention which embodies extrusion of a gel or cogel of preselected pore size distributions falling within the R-1 and R-2 catalyst ranges, or which contains pores of size distribution sufficiently large that when the gel is subjected to extrusion at the required conditions the reduction in the size of the pores caused by the extrusion and aging steps will reduce the pore sizes such as to cause them to fall within the R-1 and R-2 catalyst ranges. The gel or cogel, at the time of extrusion, is of critical liquids-solids content (generally produced by drying), it has been previously aged within syneresis liquid for preselected periods at conditions involving critical time, temperature, or time-temperature relationships and, after extrusion, the extrudate is dried to provide a critical liquidsolids content and, in a preferred embodiment, then returned to syneresis liquid, without washing, and again aged for specific critical periods at conditions involving critical time, temperature, or time-temperature relationships.

In the preparation of an extrudate, a gel or cogel is initially prepared from a sol, preferably one containing a Group VIII noble metal, or metals, or lanthanum and lanthanum series metals, or admixtures thereof, in the range of proportions previously described, by varying the molar ratios of water (or alcohol):aluminum halide and olefin oxide:halide, and also within the ranges described consistent with the requirements of producing an R-1 catalyst, if an R-1 catalyst is desired, or with the requirements of producing an R-2 catalyst, if an R-2 catalyst is desired. Subsequent to formation of gel or cogel of the required properties, the gel or cogel is initially aged in syneresis liquid at critical time, temperature, or time-temperature relationships sufficient to increase the crush strength of the finished particle and to provide the desired pore size distribution of the gel or cogel, or to preserve such pore size distribution sufficiently that when subjected to extrusion and further aging at the required conditions the reduction in size of the pores caused by the extrusion will produce pore size distributions falling within the R-1 and R-2 catalyst ranges. This is accomplished in part by the presence of the Group VIII noble metals or lanthanum series metals, or both, which inhibits or tends to inhibit the normal tendency to reduce the sizes of the pores during the necessary step, or steps, of aging. The crush strength is increased, and pore size distribution preserved by aging the gel or cogel prior to extrusion, preferably containing the Group VIII or lanthanum series metals, or both, in syneresis liquid (1) for an initial time period ranging at least 6 hours, and up to about 30 days, or longer, preferably for a period of from about 1 day to about 6 days, and more preferably from about 24 hours to about 72 hours, at generally ambient temperatures, i.e., about 50° F. to about 80° F., or by aging (2) at elevated temperatures ranging from about 80° F. to about 180° F., preferably from about 100° F. to about 160° F., or by aging (3) at a combination of timetemperature relationships within these ranges of express conditions. It is preferred, however, to subject the gel or cogel to an initial aging for a rather short period, (a) preferably from about 1 to 3 days or, more preferably, from about 24 hours to about 30 hours, at ambient conditions, or (b) at higher temperatures ranging from about 80° F. to about 180° F., preferably 100° F. to about 160° F. for shorter periods, preferably ranging from about 10 hour to about 24 hours, and more preferably from about 15 hours to about 20 hours, and then to extrude, dry the extrudate to a critical liquid-solids content, and thereafter again subject the extrudate to a subsequent aging in syneresis liquid.

The gel or cogel, after the initial aging period, is separated from the synersis liquid and partially dried by standard techniques, e.g., as described, to produce a gel or cogel containing from about 12 percent to about 40 percent, and preferably from about 15 percent to about 25 percent solids content, based on the total weight of the gel or cogel with its occluded liquid. The gel or cogel is preferably crushed to less than 10 mesh (Tyler series) particle sizes and then extruded through a die to produce extrudates of desired diameter, and the extrudates are then cut into desired lengths. Efforts, on the one hand, to extrude a gel or cogel having too low a solids content generally prove unsuccessful or, if successful, the extrudates will be of poor quality and may even deteriorate and crumble on subsequent aging in syneresis liquid. Extrusion of a gel of too high solids content adversely affects the pore size distribution previously developed in the gellation, the crush strength and the larger pores generally being substantially reduced in size. After extrusion, and formation of the extrudate, the extrudate must again be dried to a solids content of >25 wt.%. If the extrudate is to be subsequently aged, as preferred, the extrudate, after drying, is then directly transferred, without washing, to the syneresis liquid. In the subsequent aging in syneresis liquid, the extrudate is again treated at critical time, temperature, or time-temperature relationships to preserve the required R-1 and R-2 pore size distributions. Suitably, this is accomplished by aging the extrudate in the syneresis liquid (1) for a period ranging at least 6 hours, and up to about 30 days, or longer, preferably for a period ranging from about 1 day to about 6 days, and more preferably from about 24 to about 72 hours at ambient conditions, or by aging (2) at elevated temperatures ranging from about 80° F. to about 180° F., preferably from about 100° F. to about 160° F., for periods ranging from about 10 hours to about 24 hours, preferably from about 15 hours to about 20 hours, or by aging (3) at a combination of time-temperature relationships within these express conditions. The extrudate is then agan necessarily dried to provide a solid content of >25 wt.%, and then washed, preferably with alcohol. Failure to dry the gel to the required solids content can produce disintegration of the particles in washing. A gel or cogel properly aged, properly dried to the required liquids-solids content, properly extruded, without washing, and then again dried to the required solids content, the extrudate subsequently aged for the required period, and then dried to the required solids content prior to washing will provide extrudates of superior strength and quality.

A low torque extruder, Model 0.810 Research Extruder manufactured by Welding Engineers of King of Prussia, Pennsylvania, has been found to produce extrudates of outstanding quality when produced pursuant to these specifications. Extrudates of superior crush strength can be formed in producing both R-1 and R-2 types of catalysts. After passage through a die to provide shapes of predetermined selected diameter, particularly for use in ebullating and fixed beds, the extrudates can be cut in the desired lengths, dried to critical solids content, aged in the syneresis liquid and again dried to control solids content, washed, preferably in alcohol as previously described, again dried, calcined and, where desired, to so-formed extrudate then impregnated with the desired metal, or metals, or with an additional metal, or metals.

The metals-containing catalyst, whether formed as a gel or cogel, can then be contacted with hydrogen and hydrogen sulfide, or hydrogen sulfide precursor, or both, in situ or ex situ, in a subsequent step, or steps, to reduce and sulfide all or part of the metal salts and activate the catalyst. The sulfiding is generally carried out by passing hydrogen sulfide in admixture with hydrogen through a zone of contact with the catalyst. The temperature of sulfiding is not especially critical, but is generally carried out in the range of about 500° to about 900° F., preferably from about 600° F. to about 750° F. The time required for the sulfiding of the metals is generally short and not more than an hour, or at least no more than one to four hours is generally required to complete the sulfiding. Typically, in sulfiding the catalyst, the catalyst is contacted with a dilute gaseous solution, e.g., about 5 to about 15 percent, preferably from about 8 to about 12 percent, of hydrogen sulfide in hydrogen, or hydrogen plus other nonreactive gases, and the contacting is continued until hydrogen sulfide is detected in the effluent gas. Such treatment converts the metals on the catalyst to the sulfide form. Sulfur-containing hydrocarbons, such as gas oils and the like, may be used as hydrogen sulfide precursors.

In accordance with the present hydroconversion process, the R-1 catalyst is contacted in a reaction zone with a hydrocarbon or hydrocarbonaceous feed, e.g., a liquid derived from coal by hydrogenation, a heavy crude or residua feed, in the presence of hydrogen, at conditions of severity sufficient to achieve the desired conversion of the 1050° F.+ materials to lower molecular weight, or 1050° F.− materials, and simultaneously to remove at least about 80 weight percent, and preferably from about 85 weight percent to about 90 weight percent of the heavy metals, particularly vanadium and nickel, from the feed. Removal of the heavy metals is enhanced by the combination of conditions, particularly that of temperature, which enhances the conversion and results in some cleavage and reduction in the size of the asphaltenes, and the selective pore size distribution of the R-1 catalyst, the 100–275A pore size openings accepting asphaltenes ranging from small to relatively large size, with regard to whether or not such molcules were originally of such size or reduced in size by the conditions of reaction. The small to relatively large size asphaltenes readily diffuse, with hydrogen, into the depths of the catalyst particles wherein hydroconversion reaction egressing from the particle, along with unreacted materials, as more highly hydrogenated lower boiling products.

In conducting the reaction, the R-1 catalyst is generally employed in one or more stages of a reactor, or reactors, aligned in series (which can and usually does include one or more stand-by or swing reactors, as desired). The R-1 catalyst, after being reduced and sulfided generally in situ within the reactor, is operated under conditions, the major variables of which are tabulated for convenience, as follows:

|  | Operable | Preferred |
| --- | --- | --- |
| Temperature, ° F., E.I.T[1] |  |  |
| Start-of-Run | 700 | 750 |
| End-of-Run | 850 | 800 |
| Pressure, psi | 2000–10,000 | 2000–5000 |
| Hydrogen Rate, SCF/B | 3000–20,000 | 3000–10,000 |
| Space Velocity, LHSV | 0.25–5.0 | 0.5–1.0 |

[1] Equivalent Isothermal Temperature (E.I.T)

The hydrocarbon or hydrocabonaceous feed, i.e., coal liquid, heavy crude or residua, is rendered by R-1 service more suitable as a feed for use in a coking process or a resid catalytic cracking process. Preferably, however, the product of R-1 service is rendered a suitable grist for R-2 service, and thereby made suitable as a feed for use in conventional petroleum refining processes, especially as a feed for a hydrocracking or catalytic cracking operation. The R-2 catalyst, as heretofore suggested, is of pore size distribution selective of a range of asphaltene molecules smaller than those accepted within the pores of the R-1 catalyst. The asphaltenes in the R-1 product are generally smaller than those of the raw feed and can quite readily diffuse into the pores of the R-2 catalyst. The R-2 reactor is specifically designed to remove the remaining metals such that the product will contain <5 ppm metals and <2–3 wt.% Con. carbon. Conditions are needed that favor the hydrogenation of the fused benzene rings of the asphaltene fragments followed by the cracking and dealkylation of the saturated rings. In this way, Con. carbon can be effectively reduced to the desired level. These conditions also favor the removal of the very refractory remaining metals. Conditions favoring this type of reaction are low start-of-run temperature, e.g., 650°–700° F., at high hydrogen partial pressure, e.g., 2000–5000 psig.

In contrast to the R-1 catalyst, the R-2 catalyst removes less metals and Con. carbon on an absolute basis but percentage-wise it removes about the same amount of the metals. This is also true of the sulfur and nitrogen removal reactions. However, this catalyst is more effective on the most refractory molecules and must be quite active to accomplish this reaction, especially at the low temperature required.

The R-2 catalyst, which differs from R-1 catalyst, is effective in the hydroconversion of smaller molecules, far more so than an R-1 type catalyst. Albeit it has pores maximized within a range of diameters smaller than the R-1 catalyst, it does not encounter diffusion problems with the conversion material produced in R-1 service. The smaller pores prevent the very large asphaltene molecules from entering the pores which severely diminish the much needed hydrogenation function of the catalyst.

In R-2 service, the R-2 catalyst is generally employed in one or more stages of a reactor, or reactors aligned in series. The R-2 catalyst, after being reduced and sulfided generally in situ within the reactor, is operated under conditions, the major variables of which are tabulated for convenience as follows:

|  | Operable | Preferred |
| --- | --- | --- |
| Temperature, ° F., E.I.T. |  |  |
| Start-of-Run | 600 | 650 |
| End-of-Run | 850 | 775 |
| Pressure, psi | 2000–10,000 | 2000–5000 |
| Hydrogen Rate, SCF/B | 3000–20,000 | 3000–10,000 |
| Space Velocity, LHSV | 0.25–5 | 0.25–2.0 |

The invention will be more fully understood by reference to the following selected nonlimiting examples and comparative data which illustrate its more salient features. All parts are given in terms of weight units except as otherwise specified.

Examples 1–7, immediately following, describe preparation of a series of R-1 and R-2 catalysts, inclusive of gels and cogels, wherein pore size distribution is controlled and set during gellation. Examples 1–4 thus describe the preparation of gel type catalysts under varying conditions which favor the formation of R-1 or R-2 catalysts, respectively. Catalysts A and B are thus R-1 precatalysts, and Catalysts E and F are R-2 precatalysts. Example 5 describes preparation of R-1 catalysts, prepared from cogels, including Group VIB and VIII metals. Examples 6–7 describe preparation of vastly improved gel type catalysts of both the R-1 and R-2 types.

EXAMPLES 1–4 (PREPARATION OF GEL-TYPE CATALYSTS, A, B, E AND F)

In a first series of preparations, 1160 gram portions of $AlCl_3 \cdot 6H_2O$ were weighed, transferred to large glass beakers, and then slurried in portions of deionized water ranging from 15:1 to 27:1. The several portions of slurried material were each then cooled to 35° F., and gaseous ethylene oxide was then introduced at a rate of 12.5 grams per minute until sufficient ethylene oxide had been added to provde molar ratios of $C_2H_4O/HCl$ ranging from 1.1 to 1.6.

The resulting clear solutions were then allowed to slowly warm to an ambient temperature of 75° F., a rigid gel having begun to form after about 1 hour. The gels were permitted to age at this temperature for periods ranging 24 to 72 hours, each in contact with its own syneresis liquid, the syneresis liquid having become visible as a stratified layer above the blocks of solidified gels and between the glass walls and side boundaries of the solidified gels which shrink away from the glass and exude the syneresis liquid.

The gels, after the aging period, were each then separated from its respective syneresis liquid by merely pouring off the liquid. The gels, having the appearance of dry blocks of material, were then crushed into particulate masses, and each then thoroughly washed with 5 gallons of isopropyl alcohol containing 1000 cc $NH_4OH$ in a column or by successive decantation. The washing was continued in each instance until the effluent from the column was free of chloride, as determined by testing for chloride with silver nitrate test solution. The particulate masses were then thoroughly dried in air for 15–25 hours and at 190° F. for periods ranging between 6 and 24 hours, and thereafter calcined at 1000° F. for periods of from 2 to 4 hours.

The materials formed in these syneresis reactions, which were found admirably suitable as supports for use in the preparation of both R-1 and R-2 catalysts, are characterized in Table I as R-1 Catalysts A and B and R-2 Catalysts E and F, respectively.

EXAMPLE 5 (PREPARATION OF COGEL-TYPE CATALYSTS D AND D')

The foregoing procedure was repeated, except that in this instance two cogels were separately prepared, each according to the following specifics: 1160 grams of $AlCl_3 \cdot 6H_2O$ was slurried in 500 cc deionized water and, after addition of one-half of the required amount of ethylene oxide, solutions were added which contained (a) 64.2 grams of $CoCl_2 \cdot 6H_2O$ dissolved in 200 cc $H_2O$ and (b) 95 grams of phosphomolybdic acid dissolved in 200 cc $H_2O$. The balance of the ethylene oxide was then added. The final preparation of a catalyst, which contained 6 wt.% CoO and 20.5 wt.% $MoO_3$, was then completed, these catalysts being identified as Catalysts D and D' in Table I.

EXAMPLES 6-7 (PREPARATION OF IMPROVED GEL-TYPE CATALYSTS C AND G)

Examples 1-4 were again repeated except that in this instance 1.0 wt.% rhodium or 3.5 wt.% lanthanum was slurried with the $AlCl_3 \cdot 6H_2O$ in preparation of the sol. The catalysts formed in this manner are identified in Table I as Catalysts C and G, respectively.

The data presented by reference to Table I thus show that catalysts, having only a marginal amount of pore sizes in diameters less than 50A, i.e., 50A−, and with a large amount, preferably a maximum of pore sizes in diameters ranging 150-250A can be prepared by maintaining molar ratios water:aluminum chloride of about 15 to 30, preferably 18 to 27; molar ratios ethylene oxide:HCl of about 1.5 to 2, preferably 1.5 to 1.7; and by aging the catalysts for periods ranging from about 1 to 3 days, preferably from 1 to 2 days. In preparing catalysts with smaller pores, these data show that such catalyst can be also prepared with a minimum of pore sizes of diameter within the 50A− and 300A+ ranges, and with a maximum of pore sizes of diameter ranging from about 100A to 200A. This is accomplished by maintaining a molar ratio of water:aluminum halide ranging about 22 to 30, preferably 26 to 28; a molar ratio of ethylene oxide:HCl of about 0.3 to 1.5, preferably 1 to 1.2; and by aging the catalyst for periods ranging about 1 to 3 days, preferably 1 to 2 days. This limited aging improves the uniformity of pore size distributions with the desired ranges, as relates to the preparation of gels and cogels. The use of trace metals such as Group VIII noble metals or lanthanum and lanthanum series metals is also found to increase the uniformity and maximization of the desirable pore size distributions. Moreover, catalysts having very large pores can be prepared having a minimum of pore sizes ranging 50A− and 350A+, and with a large amount, preferably a maximum of pores sizes of diameter ranging 175-275A suitably by preparation of a cogel as described, e.g., in Example 5, with subsequent extrusion of a paticulate mass of the cogel to provide an extrudate. Extrusion of cogel of Example 5 can thus be employed to provide extrudates of 1/16 inch particle size diameter having the properties, e.g., of Catalyst XX as described by reference to Table IV, Examples 10-17.

Once the gel is set by observing conditions which favor the desired ranges of pore size distributions, it is also important to wash the gel sufficiently to remove essentially all traces of halides and syneresis liquid. Failure to accomplish this removal will result in a loss of the developed pore size distributions. An alcohol wash has been found particularly effective in such capacity, the $C_2$ to $C_6$ alcohols, particularly the $C_3$ or isopropyl alcohol, having been found particularly effective in preserving the developed pore size distribution throughout the subsequent steps required in completing the preparation of the catalysts.

The actual water content of the alcohol used in the wash was found to have a profound effect on the pore size distributions, the surface areas and pore volumes of the catalysts, and on subsequent drying it was found that these properties vary dependent on the amount of water, if any, contained in the alcohol wash. As with the syneresis liquid, if the wash alcohol contains water, the pore volume shrinks with only minor attendant reduction in surface area. The result is a reduction in the average size of the pores. Thus, because water decreases pore size distribution and pore volume, it is generally preferred to use anhydrous alcohol for catalyst preparations. The following examples demonstrate the effect of water on these properties, especially on pore volume and pore size distributions in the alcohol washing and drying sequence.

TABLE 1

| Catalyst Type | A $Al_2O_3$-gel | B $Al_2O_3$-gel | C[1] Improved $Al_2O_3$-gel | D[3] Cogel | D' Cogel | E $Al_2O_3$-gel | F $Al_2O_3$-gel | G[2] Improved $Al_2O_3$-gel |
|---|---|---|---|---|---|---|---|---|
| $H_2O/AlCl_3$, Mol/Mol | 27 | 18 | 15 | 15 | 15 | 27 | 27 | 28 |
| $C_2H_4O$/HCl, Mol/Mol | 1.6 | 1.6 | 1.6 | 1.6 | 1.6 | 1.1 | 1.1 | 1.4 |
| Age, Days | 1 | 1 | 3 | 1 | 1 | 1 | 2 | 1 |
| Surface Area, m²/gm[4] | 352 | 339 | 325 | 330 | 373 | 270 | 313 | 373 |
| Pore Volume, cc/gm[4] | 1.77 | 1.76 | 1.85 | 1.23 | 1.5 | 0.81 | 1.10 | 1.23 |
| Pore Volume Distribution, | | | | | | | | |
| % in 50A− | — | — | — | 1.5 | — | | | |
| 50-150A | — | 0.6 | — | 15.5 | 26.0 | | | |
| 150-250A | 25.0 | 18.7 | 40.2 | 44.1 | 47.1 | | | |
| 250-350A | 69.5 | 55.4 | 59.8 | 33.0 | 20.1 | | | |
| 350A+ | 5.5 | 25.3 | — | 5.9 | 6.8 | | | |
| % in 50A− | | | | | | — | — | — |
| 50-100A | | | | | | 19.7 | 1.0 | 6.3 |
| 100-200A | | | | | | 78.1 | 87.7 | 91.5 |
| 200-300A | | | | | | 2.2 | 6.8 | 1.6 |

TABLE 1-continued

| Catalyst Type | A<br>$Al_2O_3$-gel | B<br>$Al_2O_3$-gel | C[1]<br>Improved<br>$Al_2O_3$-gel | D[3]<br>Cogel | D'<br>Cogel | E<br>$Al_2O_3$-gel | F<br>$Al_2O_3$-gel | G[2]<br>Improved<br>$Al_2O_3$-gel |
|---|---|---|---|---|---|---|---|---|
| 300A+ | | | | | — | | 4.5 | 0.6 |

[1]Contains 1% Rh added during gellation.
[2]Contains 3.5% $La_2O_3$ added during gellation.
[3]Contains 6% CoO, 20.5% $MoO_3$, 1% $P_2O_5$.
[4]Surface area measurements are B.E.T. areas measured by nitrogen adsorption at the boiling point of nitrogen using a standard single point determination at a nitrogen pressure of 160 mm Hg in which the term C in the B.E.T. equation is assumed to be constant and equal to 70. Errors introduced into the surface area measurement by the assumption of C=70 generally do not exceed 5% over that obtained from the rigorous multi-point measurement. Pore volumes are total pore volumes measured at the saturation pressure of boiling liquid nitrogen.

EXAMPLE 8

A series of gel type catalysts (H, I, J, K, L) was prepared, the preparation steps employed and the composition of these catalysts being similar to that previously described with regard to Catalyst B, except that these catalysts were aged somewhat longer during the period of gellation. In the preparation of these catalysts, except as regards Catalyst H, however, water in varying concentrations was added to the isopropyl alcohol used as a wash. The results of these runs are tabulated as follows:

TABLE II

| Catalyst | H | I | J | K | L |
|---|---|---|---|---|---|
| $H_2O$ in Alcohol (Vol. %) | 0 | 2.5 | 5 | 10 | 25 |
| Surface Area, $m^2$/gm | 382 | 393 | 398 | 373 | 354 |
| Pore Volume, cc/gm | 2.07 | 1.93 | 1.82 | 1.59 | 0.92 |
| Avg. Diameter, A (4 PV/SA × $10^4$) | 217 | 197 | 183 | 112 | 104 |

These data thus show that, with isopropyl alcohol, pore volume is decreased as the water content of the alcohol increases from 2.5 to 25 percent (vol.) with only nominal change in the surface area. The result is to decrease the average size of the pores.

The presence of water is also found to decrease the pore volume and pore size distributions during the impregnation steps, wherein the hydrogenation-dehydrogenation and other catalytic components are added to alumina supports. For best results, it has been found desirable to add the metals by impregnation of the supports with nonaqueous solutions of the metal salts, preferably alcohol solutions. Water, however, should not be used. The presence of water has been found to decrease both pore volume and pore size distribution drastically. It is thus believed that water enters the pores, redissolves and, during drying, some of the redistributed alumina forms deposits within the pores. Thus, some shrinkage of the previously developed pore sizes results from the use of water during the impregnation step and hence its use is preferably avoided. The following example thus presents data showing preparation of a cobalt-molybdenum on alumina catalyst by impregnation of a suitable alumina support with a metals-containing methanol solution. Comparison is made between the surface area, pore volume and pore size distribution of the catalyst and the unimpregnated support from which the finished catalyst was made.

EXAMPLE 9

Alumina prepared pursuant to the procedure used in preparation of Catalyst E was split into two portions, one, a precatalyst or support, termed for convenience Catalyst O, and a second 100-gram portion, termed Catalyst P, which was impregnated with a solution containing 32.4 grams of $CoCl_2.6H_2O$ and 47.6 grams of phosphomolybdic acid dissolved in 162 cc of methanol. Catalyst P was subsequently dried at room temperature and at 190° F. and then calcined for 2 hours at 1000° F. The two catalysts are compared in Table III, as follows:

TABLE III

| Catalyst | O | P |
|---|---|---|
| Wt.% CoO | — | 6 |
| Wt.% $MoO_3$ | — | 20.5 |
| Wt.% $P_2O_5$ | — | 1 |
| Surface Area, $m^2$/gm | 336 | 246 |
| Pore Volume, cc/gm | 0.99 | 0.61 |
| Pore Volume, Distribution, % in 50A– Pores | — | 3.7 |
| 50–150A Pores | 95.3 | 59.4 |
| 150–250A Pores | 4.7 | 31.9 |
| 250–350A Pores | — | 4.7 |
| 350A+ Pores | — | 0.3 |

These data thus show that considerable pore volume shrinkage occurred, particularly in the 50–150A pore diameter ranges even as a result of using alcohol. This shrinkage must be compensated for by forming in the gel or cogel pores of larger pore size distribution than ultimately desired realizing that the shrinkage shall constitute a compensating factor. The shrinkage can be further minimized by using $C_2$ to $C_6$ alcohols, preferably isopropyl alcohol, as the solvent.

The following examples and demonstrations describe preparation of a series of extrudates from cogels (and gels), and define certain critical features required to obtain extrudates of good quality meeting the requirements of R-1 and R-2 catalysts. The technique of making catalysts in the form of extrudates is particularly applicable to the formation of catalysts in the 1/50–1/25 and 1/25–1/8 inch particle size ranges, and sphere forming techniques, particularly as described hereinafter, are particularly applicable to the formation of catalysts in the 1/500–1/50 inch particle size ranges. In making catalysts with the desired narrow pore size distributions, as shown, it is necessary to limit the time of aging because aging produces shrinkage of pore size but, on the other hand, aging is essential if extrudates of good strength are to be made, particularly extrudates of high crush strength, especially crush strength in excess of 7 pounds. High crush strength is desirable, or necessary, in certain types of processes. Thus, techniques are described which have been found to speed up the aging process and to counteract the effect of aging which tends to decrease the pore sizes of the catalysts. The aging process can thus be carried out by (1) contact of the gel or cogel with syneresis liquid at ambient conditions for periods ranging to about 30 days, and longer; (2) contact of the extrudate, or pelletized form of the gel or cogel, for periods ranging to about 30 days, or longer, in the syneresis liquid; (3) contact of the gel or cogel in syneresis liquid in an initial step prior to contact of the extrudate, or pelletized form of the gel or cogel, in syneresis liquid, as described in (1) and (2), which is preferred; (4) by high temperature contact of the gel or extrudate (or pelletized form of the gel or cogel), or both, by (5) a combination of these steps; and (6) Group VIII noble metals, or lanthanum and rare earth metals of the lanthanum series, are preferably included in the gellation step to counteract the pore shrinkage effect of aging on pore size distribution. In these data, it will also be observed that (7) critical solids contents are required prior to or subsequent to certain steps to avoid deterioration or weakening of the gel or extrudate. These include: (a) drying to about 12–40 wt.% solids prior to extrusion or pelletizing of the gel or cogel, (b) drying to 25+ wt.% solids prior to the aging of extrudates, or pelletized gel or cogel, in syneresis liquid, and (c) again drying to 25+ wt.% solids prior to alcohol washing.

EXAMPLES 10–17

Portions of gel, or cogel, comprising metals and alumina, were each prepared by raising the temperature of sols prepared by reaction between aqueous slurries of aluminum chloride and ethylene oxide as described for the initial preparation of Catalysts D and D' (Example 5). The portions of cogel were each used to prepare a series of catalysts defined in Table IV below, referred to as Catalyts AA, BB, CC, DD, EE, FF (a gel), GG (a gel), XX and YY.

The portions of cogel (or gel) were each aged at 75° F. (Except Catalyst EE which was aged at 160° F.), prior to extrusion, in its own syneresis for periods ranging from 24 hours (1 day) to 30+ days. The portions of cogel (or gel) were then dried in air for a time sufficient to provide twenty percent solids content, based on the total weight of the gel. In these cases, to prepare Catalysts GG, XX, and YY, the aged gel (or cogel) was crushed to <10 mesh particle size before extrusion. After extrusion in a Model 0.810 Research Extruder manufactured by Welding Engineers of King of Prussia, Pa., using a 1/16 or 1/32-inch die, some of the extrudates were then further dried in air for a time sufficient to provide a twenty-five percent solids content, based on the total weight of the cogel (or gel). Some of the extrudates were then returned, without washing, to the syneresis liquid from which they were originally removed, immersed therein and aged at 75° F. for one day. The extrudates were again dried in air to 25 wt.% solids content, then subsequently washed in isopropyl alcohol, oven dried in air at 190° F., and finally calcined at 1000° F.

These several portions of gel or cogel, the manner in which each was treated, and the properties of the series of catalysts, i.e., Catalysts AA, BB, CC, DD, EE, FF, GG, XX, and YY, produced therefrom, respectively, are referred to in Table IV below. The table shows, in the first two rows of figures, the number of days that each of the catalysts was aged in syneresis liquid prior to extrusion, and the number of days, if any, that each of the extrudates was aged in syneresis liquid subsequent to extrusion. The next two rows of figures indicate, respectively, the solids content of the cogel (and gel) before extrusion, and subsequent to extrusion. The next row of figures, also given under "Extrusion Conditions" gives, respectively, the percent solids of the cogel (and gel) prior to the alcohol wash. Isopropyl alcohol was used as the wash liquid in each case. The last seven rows of figures give the properties of the several extrudates. The pore diameter, for convenience, is also listed in terms of average pore size as calculated by the conventional formula $4 \times 10^4$ times pore volume divided by surface area. For the 1/16 inch extrudate, 175–275A pores are given where for 1/32 inch extrudates 150–250A pores are given. As discussed later, these are the important ranges for the particle sizes.

TABLE IV

| Catalyst | AA | BB | CC | DD | EE | FF | GG | XX | YY |
|---|---|---|---|---|---|---|---|---|---|
| Size, Inches | | | | | 1/16 | | | | 1/32 |
| Age, Days | | | | | | | | | |
| Before Extrusion | 1 | 3 | 30+ | 1 | 1[1] | 1[2] | 1[3] | 1 | 1 |
| Extrudates in Syneresis Liquid after Extrusion | 0 | 0 | 0 | 1 | 1 | 1 | 1 | 1 | 1 |
| Extrusion Conditions | | | | | | | | | |
| % Solids before Extrusion | 20 | 20 | 20 | 20 | 20 | 20 | 20 | 20 | 20 |
| % Solids before Aging in Syn. Liq. | — | — | — | 25 | 25 | 25 | 25 | 25 | 25 |
| % Solids before Isopropyl Wash | 25 | 25 | 25 | 25 | 25 | 25 | 25 | 25 | 25 |
| Wash Liquid | | | | | Isopropyl Alcohol | | | | |
| Properties | | | | | | | | | |
| Surface Area, m²/gm | 437 | 390 | 325 | 395 | 297 | 302 | 332 | 392 | 389 |
| Pore Volume, cc/gm | 1.94 | 1.76 | 0.83 | 1.88 | 0.92 | 1.09 | 1.10 | 1.81 | 1.52 |
| Diameter, A (4 PV/SA × 10⁴) | 178 | 181 | 102 | 189 | 124 | 144 | 133 | 185 | 156 |
| Pore Size Distribution, % Pore Volume in | | | | | | | | | |
| 0–50A | 4.5 | — | 18.3 | 19.2 | 8.1 | 8.9 | 7.0 | 2.3 | 0.0 |
| 175–275A | 23.3 | — | 16.4 | 17.2 | 24.2 | 22.4 | 23.9 | 32.3 | 29.8 (150–250A) |
| 350A+ | 31.9 | — | 23.0 | 21.3 | 21.7 | 25.6 | 20.7 | 21.6 | 24.4 |
| Strength, lbs. | 1.3 | 4.2 | 10.7 | 3.7 | 14.0 | 4.6 | 8.1 | 4.4 | 3.7 |

[1] Extrudate aged at 160° F.
[2] Prepared from a gel containing 3.5 percent lanthanum (as the oxide). Later impregnated with CoCl₂.6H₂O and phosphomolybdic acid and in amount sufficient to provide 6 wt.% CoO and 20.5 wt.% MoO₃.
[3] Prepared from a gel. The aged gel was crushed to <10 mesh particle size before extrusion, and later impregnated with CoCl₂.6H₂O and phosphomolybdic acid in amount sufficient to provide 6 wt.% CoO and 20.5 wt.% MoO₃.

These data show that Catalyst AA possesses a reasonably good pore size distribution in that it has low pore volume in the 0—50A pores and 350A— pores and reasonably good pore volume in 175-275A pores. It also has good surface area and pore volume. Unfortunately, it has low strength, i.e., 1.3 lbs., but by allowing the cogel to age for 3 days prior to extrusion (Catalyst BB), the strength can be markedly improved to 4.2 lbs. Catalyst CC demonstrates the shrinkage of pores when cogel is aged 30+ days prior to extrusion. The strength is excellent at 10.7 lbs. but the low pore volume (0.83 cc/g) and excessive pores in the 0-50A confirm an excessive shrinkage due to long term aging. Catalyst DD shows that by aging the extrudates in the syneresis liquid, a catalyst with fair strength is formed (3.7 lbs.). In this case, however, the 0-50A pores were excessive due to poor temperature control during the sol forming step. It is important to control the sol forming temperature at 40°-50° F. to minimize these pores. As shown by Catalyst XX, a good extrudate is formed (4.4 lbs.) by good sol temperature control and aging of the extrudates in syneresis liquid. This catalyst had low pore volume in 0-50A and 350A+ pores and high pore volume in 175-275A pores.

Further improvements in strength can be obtained by aging the gel (or cogel) at high temperature for short times as with Catalyst EE. By aging at 160° F., a catalyst with 14 lbs. crush strength was formed. However, excessive pore volume shrinkage occurred resulting in excessive pore volume in the 0-50A pores and a low total pore volume (0.92 cc/gm).

Catalysts can also be prepared by first extruding a gel followed by impregnation of that extrudate with catalyst metals. This is demonstrated by Catalysts FF and GG. These data are for the gels prior to impregnation. Good strength was obtained (4-8 lbs.) but pore volume shrinkage occurred. Pore volume in 0-50A range is not unduly excessive, however.

One example of a 1/32-inch catalyst is given (Catalyst YY). Strength is below that desired (3.7 lbs.) but for 1/32-inch extrudates it has a good pore size distribution with minimum 0-50A pores and 350A+ pores and a large amount of pore volume is 150-250A pores which are best for 1/32-inch particles.

Spheres are the preferred forms of catalysts for use in ebullating beds and slurry reactors (reaction zones), the size thereof ranging about 1/50 inch particle size diameter, and smaller. Spheres,of course, can be utilized in a fixed bed (e.g., in particle size diameter ranging about 1/32-⅛ inch), but most often are utilized in ebullating bed and slurry reactors where particle size diameters most often range 1/32-1/250 inch, and smaller. A very effective range for spheres in ebullating and slurry reactors is from about 100 to about 500 micron diameters. There are several known techniques for forming spheres, to wit: (1) prilling, (2) gelling in a column, (3) centrifugal force, (4) gelling in a stirred vessel, or tank, and the like. In the preferred stirred tank method, a sol (gel or cogel) is heated and aged, while agitated, in a mineral oil bath generally at temperatures ranging from about 75° F. to about 150° F., preferably from about 100° F. to about 125° F. The amount of mineral oil:soil, on a volume basis, ranges generally from about 5:1 to about 20:1, preferably from about 8:1 to about 12:1. The amount of agitation of the bath, and the height and diameter of the tank, is selected to provide particles of desired size. Such technique is described in greater detail in Examples 18-20, below.

EXAMPLES 18-20

Portions of cogel, which contain metals and alumina, or portions of gel which contain alumina, were each prepared first by forming a sol as disclosed in the preparation of Catalysts D and D' (Example 5), and the sols were then added to a stirred vessel containing mineral oil.

The preparation of the sols was as described by reference to Examples 1-5, the slurried material formed by reaction between the aluminum salt and ethylene oxide having been removed from the beakers at temperatures of about 35° F., and the temperature adjusted to about 55°-65° F. over a period of one-quarter hour prior to introduction of the portion of sol into the vessel containing the mineral oil. The sol was added slowly, i.e., at a rate of about 5-75 cc/min., over a period of one-quarter hour to avoid gelling prior to the introduction.

The amount of mineral oil:soil, on a volume basis, was maintained at 10:1, and the temperature was maintained at 100°-150° F. Turbine type agitators using various blade designs were employed, the size of the particles produced being controlled by blade design, vessel design, and the speed of revolution (revolutions per minute, RPM) of the blade.

For the formation of relatively small particles (e.g., 100–200 microns) a single blade turbine operated at 250 RPM proved best. For larger particles (e.g., 300–400 microns), a six blade turbine at 75 RPM proved best. The design of the vessel is critical. It was found that the ratio of the height of the vessel (H) to its diameter (D), i.e., H/D, should range between about 1:5–1:2, preferably 1:4 to 1:3. The design of the turbine should be such that the impeller abuts the walls and bottom of the vessel. The ratio of the height of the impeller ($H_I$) to the height of the vessel, $H_I/H$, should range from about 1:2 to about 4:5, preferably from about 2:3 to about 3:4.

It is found that as the sol is added to the mineral oil, small spheres form in the oil. After completion of sol addition, the agitator is allowed to continue agitating for at least 30 minutes, preferably for a period ranging up to 2 hours. During this time, the spheres are gelled. The spheres are next separated from the oil, and the solids particles either spread out over a solid surface to age, or surface washed to remove the mineral oil to avoid agglomeration of the solids particles. Suitably, the spheres can be surface washed with varsol or isopropyl alcohol, or both, to avoid agglomeration, but care must be taken to avoid removal of syneresis liquid from the pores as opposed to mere removal of the surface oil. The spheres are aged for about 1 day. After this, the spheres are washed in isopropyl alcohol, with or without added ammonia, oven dried at 190° F., and then calcined at 1000° F. for 4 hours.

Catalysts UU, VV and WW, so produced, are characterized as having the following properties:

TABLE V

| Catalyst | UU[a] | VV[b] | WW[c] |
|---|---|---|---|
| Vol. of Mineral Oil, cc | 1000 | 10,000 | 10,000 |
| Vol. of sol, cc | 100 | 1000 | 1000 |
| Mixing |  |  |  |
| Turbine | 1 Blade | 6 Blades | 6 Blades |
| RPM | 250 | 100 | 100 |
| Gellation Temp., ° F. | 150 | 100 | 120 |
| Catalyst Properties |  |  |  |
| Surface Area, m²/g | 278 | 244 | 330 |

TABLE V-continued

| Catalyst | UU[a] | VV[b] | WW[c] |
|---|---|---|---|
| Pore Volume, cc/g | 0.54 | 0.49 | 1.15 |
| Avg. Pore Dia., A | 85 | 80 | 139 |
| Pore Size Dist., % PV in | | | |
| 0–50A | — | — | 1.9 |
| 100–200A | — | — | 33.8 |
| 300A+ | — | — | 21.0 |
| Particle Size, microns | 100–200 | 100–500 | 100–300 |

[a]No rinse/No NH₃ in wash.
[b]Rinse, no NH₃ in wash.
[c]No rinse, NH₃ in wash.

Catalyst UU was formed in quantity with a 1-blade turbine at high RPM (250) and high temperature (150° F.). The particles were small due to high RPM and impeller design. The low surface area and pore volume are due to high gella ion temperature (150° F.) and the fact that NH₃ was excluded from the isopropyl wash. Catalyst VV was made in a larger vessel with a 6-blade impeller operated at 100 RPM and 100° F. The catalyst spheres were rinsed with varsol and isopropanol in this case to avoid agglomeration, and no ammonia was included in the wash. Due to the lower RPM and impeller design, particle size was increased to 100–500 microns. Due to the improper rinse (i.e., varsol and isopropanol pretreated spheres prior to aging) and the lack of NH₃ in the wash, the surface area and pore volume are lower than desired. Catalyst WW represents an excellent spherical catalyst prepared by this technique. By forming the spheres in the larger vessel using the 6-blade turbine at 100 RPM and 120° F., spheres ranging in size from 100–300 microns were made. Further, by carefully handling the spheres before aging to avoid agglomeration without the use of varsol and isopropanol rinse, the resulting spheres possessed good surface area and pore volume. In addition, 50A pores and 300A+ pores were minimized while maximizing 100–200A pores which are highly desirable for particles in this size range. By decreasing the RPM to 75, particle size is further increased to 300–400 microns.

EXAMPLE 21

Runs were conducted with each of Catalyst D, Q and R, of 1/32 inch average particle size, by contact with Cold Lake and Jobo Crudes, respectively, in a reactor which contained the catalysts as fixed beds. The runs were each conducted at two different temperature levels, at approximately the same pressure. level of 2250 psig, at two different flow velocities and at hydrogen rates varying between 5500–8500 SCF/B. The following Table VIII shows the product inspections at the end of two different time periods, the conditions of reaction being given at the time the products were withdrawn for analysis.

Shown immediately below in Table VI are the analyses for Cold Lake and Jobo crudes. In addition, the catalyst inspections for Catalysts Q and R are given in Table VII. Catalyst Q is a commercially available hydrodesulfurization catalyst having most of its pore volume in the 0–100A region. Catalyst R was made in a manner similar to Catalyst D but with longer aging of the gel.

TABLE VI

FEED ANALYSES

| | Cold Lake Crude | Jobo Crude | Kuwait Resid. |
|---|---|---|---|
| Gravity, ° API | 11.1 | 8.5 | 16.5 |
| Sulfur, Wt.% | 4.5 | 3.8 | 3.6 |
| Carbon, Wt.% | 83.99 | 83.92 | 84.64 |
| Hydrogen, Wt.% | 10.51 | 10.49 | 11.41 |
| Con Carbon, Wt.% | 12.0 | 13.8 | 9.0 |
| Asphaltenes, Wt.% | 17.9 | 17.7 | — |
| Nitrogen, Wt.% | 0.46 | 0.68 | 0.22 |
| Metals, ppm | | | |
| Ni | 74 | 97 | 12 |
| V | 180 | 459 | 58 |
| Distillation, 1 mm | | | |
| IBP, ° F. | 463 | 518 | 451 |
| 5% (Vol.) | 565 | 627 | 577 |
| 10 | 622 | 682 | 648 |
| 20 | 712 | 798 | 737 |
| 30 | 817 | 895 | 805 |
| 40 | 916 | 978 | 865 |
| 50 | 1019 | 1037 | 937 |
| % Recovered | 56.4 | 50.8 | 64.0 |
| % Residue | 42.4 | 48.2 | 36.0 |
| FBP, ° F. | 1047 | 1047 | 1047 |

TABLE VII

CATALYST INSPECTIONS

| Catalyst | R | Q |
|---|---|---|
| Surface Area, m²/g | 362 | 260 |
| Pore Volume, cc/g | 1.79 | 0.50 |
| Pore Volume Distribution, % Pore Volume in | | |
| 0–50A Pores | 1.4 | 11.1 |
| 50–150A | 10.9 | 79.5 |
| 150–250A | 17.6 | 6.1 |
| 250–350A | 23.4 | 1.8 |
| 350A+ | 46.7 | 1.5 |
| % CoO | 6 | 3.5 |
| % MoO₃ | 20 | 12.0 |

TABLE VIII

| | Cold Lake | | | | Jobo | | | |
|---|---|---|---|---|---|---|---|---|
| | Catalyst R | | Catalyst Q | | Catalyst D | | Catalyst Q | |
| Temperature, ° F. | 651 | 751 | 651 | 751 | 600 | 750 | 600 | 750 |
| Space Velocity, V/Hr./V | 0.91 | 1.0 | 0.91 | 1.0 | 0.95 | 1.1 | 0.95 | 1.1 |
| Time on Oil, Hrs. | 277 | 1291 | 277 | 1291 | 66 | 270 | 66 | 270 |
| Product Inspections | | | | | | | | |
| Gravity, ° API | 13.0 | 18.8 | 14.2 | 16.7 | 11.2 | 18.3 | 11.2 | 16.8 |
| Sulfur, Wt.% | 2.92 | 0.99 | 2.72 | 2.37 | 2.85 | 0.81 | 2.70 | 1.60 |
| Nitrogen, Wt.% | 0.442 | 0.353 | 0.414 | 0.360 | 0.620 | 0.467 | 0.650 | 0.474 |
| Con. Carbon, Wt.% | 10.7 | 6.25 | 10.29 | 9.70 | 11.53 | 6.73 | 12.54 | 10.18 |
| Asphaltenes, Wt.% | 11.6 | 4.65 | 15.26 | 12.19 | 14.91 | 3.36 | 18.16 | 11.72 |
| Metals, ppm | | | | | | | | |
| Ni | 40.1 | 14.6 | 56.9 | 41.8 | 75.1 | 18.3 | 92.0 | 70.9 |
| V | 91.4 | 16.0 | 156.5 | 94.1 | 338.1 | 46.6 | 40.72 | 316.9 |
| 1050° F. Conversion, Wt.% | — | 29 | — | 17 | — | — | — | — |
| 1050° F. + Quality | | | | | | | | |
| Sulfur, Wt.% | | | | | | 1.42 | | 3.56 |

TABLE VIII-continued

| | Cold Lake | | Jobo | |
|---|---|---|---|---|
| | Catalyst R | Catalyst Q | Catalyst D | Catalyst Q |
| Con. Carbon, Wt.% | | | 17.3 | 25.55 |

These data thus show that Catalyst Q, the commercial hydrodesulfurization catalyst, is completely unsuitable for the treatment of these heavy crudes at hydroconversion conditions, although Catalysts D and, to a lesser extent, Catalyst R are well suited for such purpose. Whereas Catalyst Q does effectively hydrodesulfurize the crude in some cases, the data clearly show that it is entirely unsuitable for removal of heavy metals, for the reduction of Con. carbon, and for the conversion of asphaltenes.

In other comparative runs, for purposes of demonstration, Kuwait residua, a more conventional crude characterized as a light Arabian feedstock, the inspections on which are given in Column 4 of Table V, above, Catalyst Q and Catalyst D were compared at similar but varying conditions in hydrodesulfurization reactions with the results described in Table IX, below.

TABLE IX

| Temperature, °F. | 650–750° F. | | | |
|---|---|---|---|---|
| Pressure, psig | 2000 | | | |
| Hydrogen Rate, SCF/Bbl. | 4000 | | | |
| | Catalyst Q | | Catalyst D | |
| Days on Oil | 26 | | 26 | |
| Average Temperature, °F. | 710 | | 710 | |
| Space Velocity, V/Hr./V | 0.4 | 0.6 | 0.4 | 0.2 |
| Product Inspections | | | | |
| Gravity, °API | 24.8 | 22.7 | 23.6 | 24.1 |
| Sulfur, Wt.% | 0.25 | 0.64 | 0.45 | 0.28 |
| Nickel, ppm | 5.3 | 2.7 | 1.1 | 0.2 |
| Vanadium, ppm | 12.5 | 5.4 | 2.3 | 1.7 |
| Nitrogen, Wt.% | 0.09 | 0.17 | 0.16 | 0.14 |

These data show that Catalyst Q is better for desulfurization (and denitrogenation) of a light feedstock that Catalyst D which is less satisfactory. However, the catalyst of the invention (Catalyst D) is superior in metals removal even for this light feed,

EXAMPLE 22

Diffusion plays a very important role in the conversion of asphaltenes and removal of nickel and vanadium from heavy crudes. This is due to the larger size of the diffusing molecules. Since sulfur is found in smaller molecules, the sulfur removal reaction is much less restricted by diffusion. This is demonstrated in the following example. A catalyst was prepared in a manner similar to that used in the preparation of Catalyst D. This catalyst is designated Catalyst AAA. Properties of this catalyst are given in the table below:

| CATALYST AAA | |
|---|---|
| Surface Area, m²/g | 366 |
| Pore Volume, cc/g | 1.33 |
| Pore Volume Distribution, % | |
| 0–50A Pores | 4.3 |
| 50–100A | 10.0 |
| 100–150A | 13.3 |
| 150–175A | 5.2 |
| 175–200A | 6.5 |
| 200–250A | 13.4 |
| 250–275A | 6.3 |
| 275–300A | 6.9 |
| 300–350A | 9.7 |
| 350A+ | 24.7 |
| % CoO | 6 |
| % MoO$_3$ | 20 |

This catalyst was divided into three parts, each crushed, and sized to provide particles having average diameters equal to 1/85, 1/43 and 1/29 inch, respectively. Each of these catalysts was loaded into reactors and used to hydroconvert Cold Lake Crude, the properties of which are given in Table VI. Conditions for the tests were 775° F., 2250 psig, 2.6 V/Hr./V and 6000 SCF/B hydrogen gas rate. Product inspections were obtained after 20 hours on oil and are shown below:

| Catalyst Size, Inch | 1/85 | 1/43 | 1/29 |
|---|---|---|---|
| Sulfur, Wt.% | 0.37 | 0.37 | 0.40 |
| Asphaltenes, Wt.% | 1.1 | 2.3 | 3.5 |
| Nickel, ppm | 3.1 | 5.9 | 11.2 |
| Vanadium, ppm | 1.0 | 9.0 | 19.1 |

These data show that the asphaltene, nickel and vanadium removal reactions are strongly dependent upon catalyst particle size indicating strong diffusion limitations. On the other hand, sulfur appears to be much less dependent upon particle size. It is found from these data that as particle size increases it is desirable to increase the size of the pores to decrease the diffusion limitations with larger particles. On the other hand, as particle size is decreased it is desirable to decrease the pore size, since less diffusion resistance will be encountered. Thus, larger particles (e.g., 1/16 inch) will require larger pores (e.g., 175–275A) and smaller particles (e.g., 1/64 inch) will require smaller pores (e.g., 100–200A) while intermediate particles (e.g., 1/32 inch) will require intermediate pores (e.g., 150–250A).

The following examples show that R-1 catalyst can be used to treat 1050° F.+ in heavy crudes or residua at a variety of conditions ranging from hydrotreating, with minor conversion of the 1050° F.+ materials, through hydroconversion conditions wherein a major amount of the 1050° F.+ material is converted to lower boiling products.

EXAMPLES 23–29

Catalyst D, the R-1 catalyst of Example 5, having an average particle size of 1/32 inch, was used for treating Jobo Crude (Table VI) in a series of runs wherein the severity of the reaction was gradually increased principally by a combination of decreased space velocity and increased temperature to obtain increasing rates of conversion. In Examples 23–26 the start-of-run (SOR) temperature was set at 650° F., and gradually increased during the operation to maintain a given reaction rate. In Examples 27–29, the start-of-run temperature was 700° F. These and other conditions of operation of the several runs, and the inspections obtained on the products of the series of reactions are given in Table X, below. Data are shown for Examples 23–26 at 662° F. after 517 hours on oil. Data for Examples 27–29 are at 736° F. after 805 hours on oil. In this series of runs, Examples 23 through 26 can be considered as essentially hydrotreating runs, and Examples 27 through 29 as hydroconversion runs.

TABLE X

|  | Pressure, psig | | | | 2250 | | |
|---|---|---|---|---|---|---|---|
|  | Hydrogen Rates, SCF/Bbl. | | | | 6000 | | |
|  | Temperature, ° F. (SOR) | | | | | | |
|  | Examples 17–20 | | | | 650 | | |
|  | Examples 21–23 | | | | 700 | | |
| Example No. | 23 | 24 | 25 | 26 | 27 | 28 | 29 |
| Space Vel., V/H/V | 0.79 | 0.59 | 0.39 | 0.19 | 0.98 | 0.49 | 0.24 |
| Product Inspections | | | | | | | |
| Gravity, ° API | 12.4 | 13.4 | 14.1 | 16.0 | 15.4 | 18.1 | 21.4 |
| Sulfur, Wt.% | 2.56 | 2.23 | 1.87 | 1.11 | 1.45 | 0.78 | 0.15 |
| Nitrogen, Wt.% | 0.65 | 0.62 | 0.60 | 0.55 | 0.56 | 0.49 | 0.26 |
| Con. Carbon, Wt.% | 10.4 | 11.0 | 10.3 | 7.9 | 8.3 | 6.3 | 3.8 |
| Asphaltenes, Wt.% | 10.6 | 10.0 | 9.3 | 5.4 | 7.8 | 4.2 | — |
| Metals, ppm | | | | | | | |
| Ni | 52.2 | 48.2 | 38.9 | 29.5 | 28.3 | 16.1 | 5.1 |
| V | 242.6 | 207.2 | 183.0 | 107.5 | 143.4 | 72.0 | 0.8 |
| 1050° F.+, Conv., | | | | | | | |
| Wt.% | 1.8 | 12.1 | 7.5 | 13.4 | 21.9 | 33.4 | 46.6 |
| 1050° F.+ Quality | | | | | | | |
| Sulfur, Wt.% | 3.47 | 3.09 | 2.83 | 1.89 | 2.51 | 1.49 | 0.30 |
| Con. Carbon, | | | | | | | |
| Wt.% | 23.3 | 22.7 | 20.4 | 17.5 | 21.3 | 18.4 | 10.4 |
| Metals, ppm | | | | | | | |
| Ni | 108.6 | 112.5 | 97.9 | 65.4 | 86.2 | 59.0 | 8.7 |
| V | 504.4 | 476.0 | 391.5 | 248.3 | 341.5 | 196.8 | 9.5 |
| Metal on Cat.Wt.%* | 115 | 60 | 75 | — | 168 | 100 | — |

*Wt.% on fresh catalyst at end of operation.

These data thus show that relatively high temperature is required to obtain high rates of hydroconversion of the 1050° F.+ materials, and conversely that low temperatures cannot provide adequate conversion rates, even with relatively low space velocities. The product of Examples 23 through 26 is unsuitable for coker feed because the metals content is too high, and unsuitable even as fuel because of the high sulfur content. The product of Example 26 is of marginal utility as a coker feed, but coke produced from such product would necessarily be of poor quality. The sulfur content is too high for use as fuel, and further treatment is required to render the product suitable as a fuel oil. As to the series of hydroconversion reactions, the data show that the product of Example 29 is of good quality, and even suitable as a feed for a resid catalytic cracker using amorphous silica-alumina catalysts. The product of Examples 28 and 29 can be split into 1050° F.+ and 1050° F.− fractions, and the 1050° F.+ fraction coked as presented in Example 30 below. Best use of the Example 28 product requires that it be treated in R-2 service to obtain a material having from 2 to 3 wt.% Con. carbon and <5 ppm metals, preferably <2 ppm metals, which material can then serve as a prime feed for a conventional hydrocracker or catalytic cracker. The product of Example 29 is a marginal feed for a conventional hydrocracker or catalytic cracker. The product of Example 29 is a prime feed for a resid catalytic cracker as presented in Example 38.

The product of Example 27 is marginally suitable for R-2 service, or as a marginal feed for use in coker. None of the products of Examples 27 through 29 is suitable for direct use in a conventional hydrocracker or catalytic cracker.

The following example illustrates certain advantages in use of the product of Example 29 as coker feed.

EXAMPLE 30

Case A: Jobo crude was split into two fraction, 1050° F.+ and 1050° F.− fractions. Yields for coking the 1050° F.+ fraction were predicted using correlations. The total yields were then calculated by mathematical blending.

Case B: The Example 29 product was separated into 1050° F.+ and 1050° F.− fractions. Yields for coking the 1050° F.+ fraction were predicted using correlations. The total liquid yields were calculated by mathematical blending.

The results of these calculations are given in Table XI below:

TABLE XI

| | Basis: 50 MB/D of Jobo Crude | |
|---|---|---|
| | Case A | Case B |
| $C_3$, M Lb./D | 0.87 | 0.44 |
| $C_4$, B/D | 893 | 777 |
| $C_5$/430° F., B/D | 4,434 | 3,446 |
| 430/650° F., B/D | 8,323 | 11,950 |
| 650/1050° F., B/D | 28,108 | 31,703 |
| Coke, T/D | 1,223 (5.9% S) | 373 (2.5% S) |
| $C_3^+$ Yield, Vol.% | 86 | 97 |

These comparative data show that the $C_3^+$ volume percent yield of product is 97 when coking the 1050° F.+ product of Example 29 vis-a-vis the 86 $C_3^+$ volume percent yield obtained when coking the 1050° F.+ material of the Jobo crude per se, an 11 volume percent improvement in $C_3^+$ liquid yield. Moreover, both the coke and the liquid product resulting from coking the Example 29 1050° F.+ material vis-a-vis the 1050° F.+ material from the original Jobo crude is superior.

The following presents a series of runs which show that products can be produced from 1050° F.+ heavy crudes and residua by reaction with an R-1 catalyst which are admirably suitable as feeds for R-2 service. In the following series of data, the initial temperature of the several runs is further increased as contrasted with the runs of preceding Examples 27 through 29. The space velocity is then gradually decreased, and as space velocity is lowered, it will be observed that product quality improves.

EXAMPLE 31

A series of runs, viz., Example 31, Runs 1-4, was conducted using an R-1 type catalyst, identical to Catalyst D previously described (Example 5), except that the catalyst contained 0.3 Wt.% Sn (by impregnation) in addition to cobalt and molybdenum. Again particles averaging 1/32 inch diameter were used. Jobo crude (Table V) was contacted in each instance with the catalyst at a start-of-run temperature of 760° F., the temperature being increased during the operations at an average rate of from about 1.8° to 2.2° F. per day to maintain a substantially constant rate of reaction for a given run. The following data, given in Table XII, below, were obtained at a temperature of 765° F. after 166 hours on oil.

TABLE XII

| | | | | |
|---|---|---|---|---|
| Pressure, psig | | 2250 | | |
| Hydrogen Rate, SCF/Bbl | | 6000 | | |
| Run No. | 1 | 2 | 3 | 4 |
| Space Velocity, V/Hr./V | 1.90 | 1.45 | 0.91 | 0.46 |
| Product Inspection | | | | |
| Gravity, °API | 17.3 | 17.3 | 18.5 | 20.7 |
| Sulfur, Wt.% | 1.29 | 1.08 | 0.80 | 0.20 |
| Con Carbon, Wt.% | 7.6 | 7.0 | 7.1 | 4.0 |
| Asphaltenes, Wt.% | 6.1 | 6.2 | 4.8 | 1.9 |
| Metals, ppm | | | | |
| Ni | 29.2 | 24.8 | 17.2 | 2.7 |
| V | 26.1 | 93.9 | 46.9 | 0.9 |
| 1050+° F., Conv., Wt.% | 44.3 | 38.2 | 43.5 | 56.6 |
| 1050+° F. Quality | | | | |
| Sulfur, Wt.% | 1.98 | 1.81 | 1.48 | 0.43 |
| Con Carbon, Wt.% | 26.0 | 21.7 | 24.3 | 17.2 |
| Metals, ppm | | | | |
| Ni | 96.8 | 73.5 | 64.5 | 20.6 |
| V | 363.4 | 308.0 | 189.0 | 1.5 |
| Metal on Cat., Wt.%* | 69 | 88 | 91 | 46 |

*Wt.% on fresh cat at end of operation. Runs terminated at different times on oil.

It is thus apparent by reference to Runs 3 and 4, as contrasted with Runs 1 and 2, that temperatures above about 750° F., at space velocities about 1, can provide an R-2 feed of desirable quality. Suitably, the R-2 feed is about 90 Wt.% demetallized, and hence the product of R-1 service is usually one containing metals below about 60 ppm, which metals content can be further reduced in R-2 service to 5 ppm or less. Also, Con. carbon at levels of about 7 Wt.% can be reduced to levels ranging about 2-3 Wt.% as required for use in R-2 service. In operating at these conditions, the R-1 catalyst was found suitable for about 3-4 weeks of continuous R-1 service.

The product of Example 31, Run 4, on the other hand, can be fed directly to a catalytic cracker employing zeolite catalyst as shown by reference to Example 38, if desired. The product produced in Example 29, described by reference to Table X, is a prime feed for resid catalytic cracking as shown in Example 38.

EXAMPLE 32

Several catalysts of varying pore size distribution were obtained for demonstrative purposes. Catalysts S and T are commercially available alumina which was impregnated with cobalt and molybdenum salts and then dried and calcined at conditions similar to that used in Example 9. Catalyst V, the catalyst of the invention, was prepared in a manner similar to that used for Catalyst D described by reference Example 5. A portion of each having an average particle size of 1/32 inch was then employed in a fixed bed reactor for hydroconversion of whole Jobo crude to measure the effectiveness of each in R-1 service. The pore size distributions of each of these several catalysts, termed Catalysts S, T, U, and V for convenience, the conditions under which the hydroconversion runs were conducted, and product data are tabulated in Table XIII, as follows:

TABLE XIII

| (a) Description of Catalysts: | | | | |
|---|---|---|---|---|
| Catalyst | S | T | U | V |
| Surface Area, m²/g | 250 | 217 | 259⁽¹⁾ | 362 |
| Pore Volume, cc/g | 0.55 | 0.53 | 0.58⁽¹⁾ | 1.51 |
| Pore Volume Distribution, % | | | | |
| 0-50A Pores | 4.3 | 10.7 | 5.0 | 2.8 |
| 50-150A | 73.8 | 33.0 | 40.5 | 15.7 |
| 150-250A | 12.2 | 22.6 | 33.1 | 25.2 |
| 250-350A | 5.4 | 16.8 | 15.4 | 27.3 |
| 350A+ | 4.3 | 16.9 | 6.1 | 29.1 |
| % CoO | 3 | 3 | 6 | 6 |
| % MoO₃ | 13 | 21 | 20 | 20 |
| (b) Process Conditions: | | | | |
| Temperature, °F. | 789 (after 665 hours on oil, 750° F. SOR) | | | |
| Space Velocity, V/Hr./V | 1.0 | | | |
| Pressure, psig | 2250 | | | |
| Gas Rate, SCF/Bbl | 6600 | | | |
| (c) Product Inspections: | | | | |
| Catalyst | S | T | U | V |
| Product Inspection | | | | |
| Sulfur, Wt.% | 1.163 | 1.254 | 1.588 | 1.074 |
| Metals, ppm | | | | |
| Ni | 27.9 | 28.1 | 23.8 | 21.1 |
| V | 72.1 | 83.1 | 49.9 | 38.0 |
| Metal on Cat., Wt.%* | 43 | 41 | 62 | 99 |

⁽¹⁾Data obtained from pore size distribution measurement due to problem with single point nitrogen measurements for surface area and pore volume.
*Wt.% on fresh cat at 665 hours on oil.

These data thus show that Catalyst V, an R-1 catalyst, which, inter alia, contains greater than 20% of its total pore volume in the 150A to 205A range, less than 5% of its pore volume in 0-50A pores and less than 30% of its pore volume in the 350A+ range, is far superior to the other catalysts, none of which are R-1 catalysts, in terms of both sulfur and metals removal, but particularly as relates to metals removal. In terms of metals removal, an average of about 35% less Catalyst V is required to remove the same amounts of metals as would be removed by the other catalysts.

The following example shows that as total pore volume in the 150-250A range is increased, the catalyst becomes even more effective in terms of removing metals.

EXAMPLE 33

The following data are illustrative of that obtained from two different R-1 catalysts, one (Catalyst W) of which contains 56.7% of the pores in the 150-250A range and the other (Catalyst D), also described by reference to Table I except that it contains 0.3 wt.% Sn, by impregnation) of which contains 44.1% of its total pore volume in pore sizes ranging 150-250A. Each is used at similar conditions for the hydroconversion of Cold Lake Crude (Table VI). Catalyst W was prepared similarly to Catalyst C except that La was not included. The gel was impregnated by the methods of Example 9. Both catalysts were constituted of particles averaging 1/32 inch diameter. The description of these catalysts in terms of their pore size distributions, the condition of the run and the inspections on the products from the runs are given in Table XIV below:

TABLE XIV

| (a) Description of catalyst: | | |
|---|---|---|
| Catalyst | W | D |
| Surface Area, m²/g | 271⁽¹⁾ | 330 |

TABLE XIV-continued

| Pore Volume, cc/g | 1.22[1] | 1.23 |
|---|---|---|
| Pore Volume Distribution, % | | |
| 0–50A | — | 1.5 |
| 50–150A | 3.0 | 15.5 |
| 150–250A | 56.7 | 44.1 |
| 250–350A | 25.3 | 33.0 |
| 350A+ | 15.0 | 5.9 |
| % CoO | 6 | 6 |
| % $MoO_3$ | 20 | 20.5 |
| (b) Process Conditions: | | |
| Temperature, °F. | 750° F. (210–240 hours on oil) | |
| Pressure, psig | 2250 | |
| Hydrogen Rate, SCF/Bbl. | 6000 | |
| Space Velocity, V/Hr./V | 0.5 | |
| (c) Product Inspections: | | |
| Catalyst | W | D |
| Gravity, °API | 23.4 | 24.0 |
| Sulfur, Wt.% | 0.16 | 0.09 |
| Con Carbon, Wt.% | 2.5 | 2.1 |
| Asphaltenes, Wt.% | 0.9 | 1.2 |
| Metals, ppm (Ni and V) | 2.0 | 5.8 |
| 1050° F.+ | | |
| Sulfur, Wt.% | 0.29 | 0.26 |
| Con Carbon, Wt.% | 8.0 | 9.7 |
| Metals, ppm | | |
| Ni | 1.7 | 6.6 |
| V | 4.7 | 9.3 |

[1]Data obtained from pore size distribution measurements due to problems with nitrogen measurements for surface area and pore volume.

The advantages of maximizing pores within the 150–250A pore diameter range for demetallization is thus clearly illustrated. Catalysts similar to Catalyst W, but with higher pore volume in the 150–250A pore diameter range, and greater surface area, provide even greater improvements.

The following additionally shows that a Group IVA metal is effective in increasing the rate of demetallization of the catalysts of this invention.

EXAMPLE 34

Two catalysts were prepared, each at the same conditions and identical in composition one to the other, except that one contained 3 Wt.% germanium by impregnation and the other did not. These catalysts, identified as Catalyst V and V′, are similar in their composition (except as to the presence of germanium in Catalyst V′) and in their physical characteristics as relates to pore volume and pore size distribution, and method of preparation which is the same as that of Catalyst D identified by reference to Table I. Average particle size for both catalysts was 1/32 inch. Each catalyst was employed for the hydroconversion of Jobo crude, at conditions very similar to those used in Example 32 to provide products as identified in Table XV, below:

TABLE XV

| Process Conditions: | | |
|---|---|---|
| Temperature, °F. | 778° F. (496 hours on oil) | |
| Pressure, psig | 2250 | |
| Space Velocity, V/H/V | 1.0 | |
| Hydrogen Rate, SCF/B | 6000 | |
| Catalyst | V | V′ |
| Promoter | None | 3% Ge |
| Product Inspection | | |
| Sulfur, Wt.% | 1.098 | 1.308 |
| Metals, ppm | | |
| Ni | 19.4 | 14.6 |
| V | 34.1 | 23.1 |

The rate of demetallization of Catalyst V′ used for hydroconversion of the crude is thus appreciably increased as contrasted with Catalyst V which does not contain the germanium promoter.

The following examples are exemplary of an R-2 catalyst of preferred composition, the catalyst being described as used in a typical R-2 service situation for hydroconversion of an R-1 product resultant from the treatment of a whole Jobo crude by contact with R-1 catalyst at typical R-1 service conditions. The performance of the R-2 catalyst is compared with an R-1 catalyst for similar use, and with a commercially available catalyst in similar service.

EXAMPLE 35

Runs were made wherein whole Jobo crude (Table VI) was introduced into an R-1 reactor containing a fixed bed of R-1 catalyst (Catalyst V) and treated at hydroconversion conditions, the R-1 product produced being defined in Column 2 of Table XVI, below.

TABLE XVI

| (a) Conditions of Operation: | |
|---|---|
| R-1 Reactor: | |
| Temperature, °F. | 750 (SOR) |
| Pressure, psig | 2250 |
| Hydrogen Rate, SCF/Bbl. | 6000 |
| Space Velocity, V/H/V | 1.0 |
| (b) R-1 Product: | |
| Gravity, °API | 16.8 |
| Sulfur, Wt.% | 1.40 |
| Carbon, Wt.% | 86.44 |
| Hydrogen, Wt.% | 11.25 |
| Con. Carbon, Wt.% | — |
| Asphaltenes, Wt.% | 5.49 |
| Metals, ppm | |
| Ni | 24.6 |
| V | 39.7 |
| Nitrogen, Wt.% | 0.577 |
| Distillation, Wt.% | |
| IBP | 300 |
| 5% | 455 |
| 10 | 515 |
| 20 | 600 |
| 30 | 675 |
| 40 | 747 |
| 50 | 825 |
| 60 | 944 |
| % Recovered | 65 |
| % Residue | 35 |
| FBP | 1047 |

The R-1 product, characterized in Table XVI (b), was then successively passed over Catalyst V (Example 34), having particles averaging 1/32 inch diameter, at a start-of-run temperature of 750° F., 6000 SCF/Bbl $H_2$, 2250 psig and with space velocities varying from 0.49 to 1.93 V/Hr./V. Data shown in Table XVII are for products withdrawn from the reactor at 755° F. after 161 hours on oil.

TABLE XVII

| V/Hr./V | 0.49 | 0.83 | 0.95 | 1.93 |
|---|---|---|---|---|
| Product Inspections | | | | |
| Gravity, °API | 23.5 | 19.8 | 18.3 | 17.5 |
| Sulfur, Wt.% | 0.10 | 0.38 | 0.71 | 1.05 |
| Asphaltenes, Wt.% | 0.86 | 2.48 | 3.88 | 4.32 |
| Metals, ppm | | | | |
| Ni | 1.7 | 9.5 | 14.6 | 18.0 |
| V | 0.1 | 0.3 | 5.7 | 37.3 |

These results show that the R-1 type of catalyst is not ideally suited for R-2 service. High temperatures and low space velocities are required to reach the R-2 catalyst target of <5 ppm metals and 2–3 Wt.% Con. carbon (<1 Wt.% asphaltenes).

A catalyst with maximum pores in the 100–200A range is preferred for R-2 service as shown in the next example. In addition, it is preferred to operate at lower temperature where equilibrium favors aromatics saturation enhancing Con Carbon removal.

EXAMPLE 36

The R-1 product characterized in Table XVI (b) was successively passed over Catalyst V and a commercially available hydrotreating Catalyst X which is characterized in Table XVIII (a). The catalysts, averaging 1/32 inch in particle diameter, were evaluated at a start-of-run temperature of 700° F., 6000 SCF/B $H_2$, 2250 psig and 0.5 V/Hr./V. Data shown in Table XVIII (b) are for products withdrawn from the reactor at 700° F. after 93 hours on oil.

TABLE XVIII (a) Description of Catalyst X

| | |
|---|---|
| Surface Area, m²/g | 222 |
| Pore Volume, cc/g | 0.58 |
| Pore Volume Distribution, % | |
| 0–50A Pores | 1.6 |
| 50–100A | 32.9 |
| 100–200A | 51.8 |
| 200–300A | 9.0 |
| 300A+ | 4.7 |
| % NiO | 3.0 |
| % $MoO_3$ | 18.0 |

(b) Characterization of R-2 Product

| Catalyst | X | V |
|---|---|---|
| Product Inspection | | |
| Gravity, ° API | 20.7 | 19.8 |
| Sulfur, Wt. % | 0.207 | 0.282 |
| Asphaltenes, Wt. % | 0.83 | 1.29 |
| Metals, ppm | | |
| Ni | 7.7 | 8.4 |
| V | 0.1 | 0.1 |

The data show that the commercial Ni/Mo catalyst with 52% of its pores in the 100–200A region is more active for sulfur, asphaltene and metals removal at the conditions than the R-1 catalyst which has less of its pores in 100–200A region.

The catalyst of the invention for R-2 service wherein pores in the 100–200A region are further maximized is shown to be superior to the commercially available catalyst (Catalyst X) in Example 37.

EXAMPLE 37

The R-1 (Table XVI (b)) was successively passed over Catalyst X (Commercial catalyst of Example 36) and Catalyst P (Example 9), having average particle size diameters of 1/32 inch, at 650° F. start-of-run temperature, 6000 SCF/B $H_2$, 2550 psig and 0.5 V/Hr./V. Catalyst Y is characterized in Table XIX (a) and the product inspection for product withdrawn at 650° F. after 48 hours on oil is shown in Table XIX.

TABLE XIX (a) Description of Catalyst Y

| | |
|---|---|
| Surface Area, m²/g | 212 |
| Pore Volume, cc/g | 0.43 |
| Pore Volume Distribution, % | |
| 0–50A Pores | 8.1 |
| 50–100A | 19.4 |
| 100–200A | 58.3 |
| 200–300A | 13.1 |
| 300A+ | 1.1 |
| % NiO | .6 |
| % $MoO_3$ | 20 |

(b) Characterization of R-2 Product

| Catalyst | X | Y | P |
|---|---|---|---|
| Product Inspection | | | |
| Gravity, ° API | 18.5 | 18.6 | 18.8 |
| Sulfur, Wt. % | 0.436 | 0.533 | 0.287 |
| Asphaltenes, Wt. % | 2.1 | 2.5 | 1.7 |
| Metals, ppm | | | |
| Ni | 9.4 | 9.0 | 6.0 |
| V | 2.8 | 0.9 | 0.7 |

These data thus show the advantage for having less than 10% of the pore volume in 0–50A pores and greater than 55% of the pore volume in 100–200A pores and less than 25% of its pores in 300A+ pores. Catalyst Y with 58% of its pores in the 100–200A region shows some advantage for demetallization over Catalyst X which had 52% of its pore volume in 100–200A pores. Both were Ni/Mo catalysts. Catalyst P, a Co/Mo catalyst with 58% of its pore volume in 100–200A pores and 3.7% of its pore volume in 0–50A pores and 1.6% of its pores in 300A+ pores was the most outstanding catalyst for R-2 service.

EXAMPLE 38

The conditions for the R-1 reactor can be varied to yield product which is suiable for coking, for resid catalytic cracking by contact with amorphous silica alumina (3A), for use in zeolite catalytic cracking or for further treatment in the R-2 reactor to produce a product containing <5 ppm metals, preferably <2 ppm metals, with a Con. carbon of less then 3 wt.%. The material from R-2 service is suitable for conversion in a conventional catalytic cracking or hydrocracking unit. Results of such runs are summarized in Table XX, below.

TABLE XX

Jobo Feed - 2250 psig, 6000 SCF/B $H_2$

| Process | Coking | R-1 Plus Coking | R-1 Plus 3A C/C | R-1 Plus Zeolytic C/C | R-1/R-2 Plus Zeolytic C/C |
|---|---|---|---|---|---|
| R-1 Conditions | | | | | |
| SOR Temp., ° F. | — | 700 | 700 | 760 | 760 |
| Space Velocity, V/Hr./V | — | 0.4 | 0.25 | 0.5 | 1.0 |
| Avg. R-1 Product | | | | | |
| Sulfur, Wt. % | — | 0.67[1] | 0.32[1] | 0.22[2] | 0.76[2] |
| Metals, ppm | — | 62 | 10 | 5 | 60 |
| Con. Carbon, Wt. % | — | 5.3 | 3.8 | 4.0 | 6.5 |
| Catalytic Cracking Conditions | | | | | |
| 430° F. + Conv., % | — | — | 25 | 80 | 80 |
| Catalyst Addition Rate, Lb./B | — | — | — | 1.0 | 0.4 |
| Estimated Yields | | | | | |
| $C_3^+$, Vol. % | 86 | 97 | 97 | 107 | 110 |
| Coke, Wt. % | 13.8 | 4.4 | 7.5[3] | 7.5[3] | 6.7[3] |

TABLE XX-continued

| | | | | | |
|---|---|---|---|---|---|
| Sulfur in Coke, Wt. % | 5.9 | 2.5 | — | — | — |

[1] Analyses averaged for total run; life expected to be greater than 2 months.
[2] Analyses averaged for total run; life expected to be 3-4 weeks.
[3] Coke make on cat cracking (C/C) catalyst.

These data show that coking of raw Jobo crude results in 86 vol.% yield of $C_3^+$ and a 13.8 wt.% yield of sour coke (5.9% S). When the crude is treated in R-1 at 700° F. and at 0.4 V/Hr./V, the product is a prime coker feed. Coking the feed increases the $C_3^+$ yield to 97 vol.% and reduces the coke to 4.4% (2.5% S). Published data and correlations show that if the severity of R-1 is increased by reducing the space velocity to 0.25 V/Hr./V, the product is then suitable for resid catalytic cracking using amorphous $SiO_2/Al_2O_3$ catalyst. The yields produced are 97 vol.% $C_3^+$ and 7.5 wt.% coke. If the severity of R-1 is further increased to 760° F. and 0.5 V/Hr./V, the product is suitable for catalytic cracking using zeolite cracking catalyst. In this instance, the yields produced are 107 vol.% $C_3^+$ and 7.5 wt.% coke. Moreover, using the preferred reaction sequences of R-1/R-2 catalysts, this product can be catalytically cracked using zeolite catalysts to produce yields of 110 vol.% $C_3^+$ and 6.7 wt.% coke. These results show the wide versatility and capabilities of these catalysts and processes.

It is apparent that various modifications and changes can be made without departing the spirit and scope of the present invention.

Pore size distributions, as percent of total pore volume, for purpose of the present invention are measured by nitrogen adsorption wherein nitrogen is adsorbed at various pressures using the Aminco Adsorptomat Cat. No. 4-4680, and multiple sample accessory Cat. No. 4-4685. The detailed procedure is described in the Aminco Instruction Manual No. 861-A furnished with the instrument. A description of the Adsorptomat prototype instrument and procedure is given in Analytical Chemistry, Volume 32, page 532, April, 1960.

An outline of the procedure is given here, including sample preparation.

From 0.2 to 1.0 g. of sample is used and the isotherm is run in the adsorption mode only. All samples are placed on the preconditioner before analysis where they are out-gassed and dried at 190° C under vacuum ($10^{-5}$ torr) for 5 hours. After pretreatment the weighed sample is charged to the Adsorptomat and pumped down to $10^{-5}$ torr. At this point, the instrument is set in the automatic adsorption mode to charge a standard volume of gas to the catalyst. This is done by charging a predetermined number of volumes as doses and then allowing time for adsorption of the nitrogen to reach equilibrium pressure. The pressure is measured in terms of its ratio to the saturation pressure of boiling liquid nitrogen. Three doses are injected and 8 minutes allowed for equilibration of each measured relative pressure. The dosing and equilibrium are continued until a pressure ratio of 0.97 is exceeded and maintained for 15 minutes. The run is then automatically terminated.

The data obtained with the dead space factor for the sample, the vapor pressure of the liquid nitrogen bath, and the sample weight are sent to a digital computer which calculates the volume points of the isotherm, the BET area, and the pore size distribution of the Barrett, Joyner, and Halenda method. [Barrett, Joyner, and Halenda, J. Am Chem. Soc. 73, p. 373.] It is believed that the Barrett, Joyner, and Halenda method is as complete a treatment as can be obtained, based on the assumptions of cylindrical pores and the validity of the Kelvin equation.

Hydrocarbon or hydrocarbonaceous feedstocks which can be treated pursuant to the practice of this invention include heavy petroleum crudes, synthetic crudes derived from coal, shale, tar sands, heavy oils and tars which contain relatively high concentrations of asphaltenes, high carbon:hydrogen ratios, high metals contents, considerable amounts of sand and scale, considerable amounts of 1050° F.+ materials, and generally high sulfur and nitrogen.

Having described the invention, what is claimed is:

1. A process for the synthesis and preparation of a catalyst support having a relatively high concentration of pores of uniformly large diameter, high surface area and pore volume comprising dispersing an aluminum halide salt in an aqueous or alcohol medium in molar ratio of water:aluminum halide or alcohol:aluminum halide ranging from about 15:1 to about 30:1 and, while maintaining the temperature within a range of from about 30° F. to about 100° F., adding olefin oxide in molar ratio of olefin oxide:halide of from about 1.5:1 to about 2.0:1 while maintaining a pH in the range of from about 5-8 to effect removal of the halide from solution and form a sol, introducing the sol into a mineral oil in volume ratio of mineral oil:sol of from about 5:1 to about 20:1, and, while maintaining a temperature ranging from about 75° F. to about 150° F., agitating sufficiently to form spheres which are transformed from sol into gel, aging the gel spheres while in contact with syneresis liquid for a period sufficient to increase the strength of the gel without significant adverse shrinkage of the size of the pores developed in the gel washing, drying, calcining, and then recovering a product comprising particles ranging about ⅛ inch average particle size diameter, and smaller.

2. The process of claim 1 wherein a Group VIB or Group VIII metal hydrogenation component, or both, is incorporated with the catalyst support to form a catalyst by dispersing a compound, or compounds, of the Group VIB or Group VIII metal within the aqueous or alcohol medium used in forming the sol, said compound being thermally decomposable to form a metal oxide, and the catalyst includes when the catalyst is of size ranging up to 1/50 inch average particle size diameter, at least about 600 20 percent of its total pore volume of absolute diameter within the range of about 100A to about 200A; when the catalyst is of size ranging from about 1/50 inch up to 1/25 inch average particle size diameter, at least about 15 percent of its total pore volume of absolute diameter within the range of about 150A to about 250A; when the catalyst is of size ranging from about 1/25 inch to about ⅛ inch average particle size diameter, at least about 15 percent of its total pore volume of absolute diameter within the range of about 175A to about 275A; a surface area ranging at least about 200 m²/g to about 600m²/g and a pore volume ranging from about 0.8 cc/g to about 3.0 cc/g.

3. The process of claim 2 wherein the recovered catalyst is characterized as follows:

| Distribution of Pore Diameters by Average Particle Size Diameter in Inches | |
|---|---|
| 1/500 up to 1/50" | |
| 0-50A | <20% |
| 100-200A | >20% |
| 300A+ | <30% |
| Pore Volume, cc/g | 0.8-1.4 |
| Surface Area, m²/g | 300-450 |
| 1/50 up to 1/25" | |
| 0-50A | <10% |
| 150-250A | >15% |
| 350A+ | <35% |
| Pore Volume, cc/g | 1.1-1.7 |
| Surface Area, m²/g | 320-475 |
| 1/25 up to 1/8" | |
| 0-50A | <5% |
| 175-275A | >15% |
| 350A+ | <40% |
| Pore Volume, cc/g | 1.3-1.9 |
| Surface Area, m²/g | 340-500. |

4. The process of claim 1 wherein one or more Group VIII noble metal, lanthanum or lanthanum series metal compounds which are thermally decomposable to form an oxide, are added to the solution in molar ratio metal:aluminum halide ranging from about 0.001:1 to about 0.06:1 during the synthesis, a Group VIB or Group VIII metal hydrogenation component, or both, is incorporated with the catalyst support to form a catalyst, by dispersing a compound, or compounds, of the Group VIB or Group VIII metal within the aqueous or alcohol medium used in forming the sol, said compound being thermally decomposable to form a metal oxide, and the catalyst is characterized as follows:

| Distribution of Pore Diameters by Average Particle Size Diameter in Inches | |
|---|---|
| 1/500 up to 1/50" | |
| 050A | <10% |
| 100-200A | >25% |
| 300A+ | <25% |
| Pore Volume, cc/g | 0.9-1.5 |
| Surface Area, m²/g | 310-500 |
| 1/50 up to 1/25" | |
| 0-50A | <5% |
| 150-250A | >20% |
| 350A+ | <30% |
| Pore Volume, cc/g | 1.3-1.9 |
| Surface Area, m²/g | 340-575 |
| 1/25 up to 1/8" | |
| 0-50A | <4% |
| 175-275A | >20% |
| 350A+ | <35% |
| Pore Volume, cc/g | 1.5-2.1 |
| Surface Area, m²/g | 350-600. |

5. The process of claim 4 wherein the molar ratio metal:aluminum halide ranges from about 0.01:1 to about 0.03:1 and the catalyst recovered is characterized as follows:

| Distribution of Pore Diameters by Average Particle Size Diameter in Inches | |
|---|---|
| 1/500 up to 1/50" | |
| 0-50A | <2% |
| 100-200A | >70% |
| 300A+ | <1% |
| Pore Volume, cc/g | 1.1-1.7 |
| Surface Area, m²/g | 325-550 |
| 1/50 up to 1/25" | |
| 0-50A | <1% |
| 150-250A | >45% |
| 350A+ | <7% |
| Pore Volume, cc/g | 1.5-2.1 |
| Surface Area, m²/g | 360-600 |
| 1/25 up to 1/8" | |
| 0-50A | <3% |
| 175-275A | >30% |
| 350A+ | <25% |
| Pore Volume, cc/g | 1.8-2.3 |
| Surface Area, m²/g | 370-650. |

6. The process of claim 2 wherein the Group VIB metal is molybdenum and the Group VIII metal is nickel or cobalt.

7. The process of claim 1 wherein the gel is aged for a period ranging from about 6 hours to about 30 days, and longer.

8. The process of claim 4 wherein the Group VIB metal is molybdenum and the Group VIII metal is nickel or cobalt.

9. The process of claim 4 wherein the gel is aged for a period ranging from about 6 hours to about 30 days, and longer.

10. The process of claim 5 wherein the Group VIB metal is molybdenum and the Group VIII metal is nickel or cobalt.

11. A process for the synthesis and preparation of a catalyst support having a relatively high concentration of pores of uniformly large diameter, high surface area and pore volume comprising dispersing an aluminum halide salt in an aqueous or alcohol medium in molar ratio of water:aluminum halide or alcohol:aluminum halide ranging from about 22:1 to about 30:1 and, while maintaining the temperature within a range of from about 30° F. to about 100° F., adding olefin oxide in molar ratio of olefin oxide:halide of from about 0.3:1 to about 1.5:1 while maintaining a pH in the range of from about 5–8 to effect removal of the halide from solution and form a sol, introducing the sol into a mineral oil in volume ratio of mineral oil:sol of from about 5:1 to about 20:1, and, while maintaining a temperature ranging from about 75° F. to about 150° F., agitating sufficiently to form spheres which are transformed from sol into gel, aging the gel spheres while in contact with syneresis liquid for a period sufficient to increase the strength of the gel without significant adverse shrinkage of the size of the pores developed in the gel separating the gel from the syneresis liquid,
drying the gel to a solids content ranging from about 12 to about 40 weight percent,
washing,
drying,
calcining; and
then recovering a product comprising particles ranging ⅛ inch average particle size diameter and smaller.

12. The process of claim 11 wherein a Group VIB or Group VIII metal hydrogenation component, or both, is incorporated with the catalyst support to form a catalyst, by dispersing a compound, or compounds, of the Group VIB or Group VIII metal within the aqueous or alcohol medium used in forming the sol, said compound being thermally decomposable to form a metal oxide, and the catalyst comprises at least about 55 percent of its total pore volume of absolute diameter within the range of about 100A to about 200A, less than 10 percent of its pore volume in pores of diameters 50A−, less than about 25 percent of its total pore volume in diameters ranging 300A+, surface areas range from about 200 m$^2$/g to about 600 m$^2$/g, and pore volumes range from about 0.6 to about 1.5 cc/g.

13. The process of claim 11, wherein one or more Group VIII noble metal, lanthanum or lanthanum series metal or compounds which are thermally decomposable to form an oxide, are added to the solution in molar ratio metal:aluminum halide ranging from about 0.001:1 to about 0.06:1 during the syneresis.

14. A process of claim 13 wherein the molar ratio metal:aluminum halide ranges from about 0.01:1 to about 0.03:1, a Group VIB or Group VIII metal hydrogenation component, or both, is incorpoated with the catalyst support to form a catalyst, by dispersing a compound, or compounds, of the Group VIB or Group VIII metal within the aqueous or alcohol medium used in forming the sol, said compound being thermally decomposable to form a metal oxide, and the catalyst recovered is characterized as follows:

| Distribution of Pore Diameters | |
| --- | --- |
| 0–50A | <1% |
| 100–200A | >70% |
| 300A+ | <1% |
| Surface Area: | 250 m$^2$/g–350 m$^2$/g |
| Pore Volume: | 0.9 cc/g–1.3 cc/g. |

15. The process of claim 13 wherein the molar ratio metal:aluminum halide ranges from about 0.01:1 to about 0.03:1, a Group VIB or Group VIII metal hydrogenation component, or both, is incorporated with the catalyst support to form a catalyst, by dispersing a compound, or compounds, of the Group VIB or Group VIII metal within the aqueous or alcohol medium used in forming the sol, said compound being thermally decomposable to form a metal oxide, and the catalyst recovered is characterized as follows:

| Distribution of Pore Diameters | |
| --- | --- |
| 0–50A | <10% |
| 100–200A | >55% |
| 300A+ | <25%. |

16. The process of claim 15 wherein the Group VIB metal is molybdenum and the Group VIII metal is nickel or cobalt.

17. The process of claim 11 wherein the gel is aged for a period ranging from about 6 hours to about 30 days, and longer.

18. The process of claim 13 wherein the gel is aged for a period ranging from about 6 hours to about 30 days, and longer.

19. The process of claim 15 wherein the Group VIB metal is molybdenum and the Group VIII metal is nickel or cobalt.

* * * * *